(12) United States Patent
Xin et al.

(10) Patent No.: US 12,477,353 B2
(45) Date of Patent: Nov. 18, 2025

(54) AUTOMATING CONFIGURATION MANAGEMENT IN CELLULAR NETWORKS

(71) Applicant: Samsung Electronics Co., Ltd., Suwon-si (KR)

(72) Inventors: Yan Xin, Princeton, NJ (US); Mehmet N. Kurt, New York, NY (US); Samuel Albert, Robbinsville, NJ (US); Russell Ford, San Jose, CA (US); Semih Yagli, Jersey City, NJ (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 481 days.

(21) Appl. No.: 18/148,365

(22) Filed: Dec. 29, 2022

(65) Prior Publication Data

US 2024/0224065 A1    Jul. 4, 2024

(51) Int. Cl.
H04W 16/22    (2009.01)
H04W 24/02    (2009.01)

(52) U.S. Cl.
CPC .......... *H04W 16/22* (2013.01); *H04W 24/02* (2013.01)

(58) Field of Classification Search
CPC .............................. H04W 16/22; H04W 24/02
See application file for complete search history.

(56) References Cited

U.S. PATENT DOCUMENTS

| | | | |
|---|---|---|---|
| 10,565,520 B2 | 2/2020 | Misra et al. |
| 10,735,287 B1 | 8/2020 | Soundrarajan |
| 10,785,101 B2 | 9/2020 | Li et al. |
| 11,283,679 B2 | 3/2022 | Feltin et al. |
| 11,496,353 B2 | 11/2022 | Chandrasekhar et al. |
| 2015/0289149 A1 | 10/2015 | Ouyang et al. |
| 2017/0063621 A1 | 3/2017 | Sanneck et al. |
| 2018/0357559 A1 | 12/2018 | Truong et al. |
| 2019/0306023 A1 | 10/2019 | Vasseur et al. |
| 2020/0213202 A1 | 7/2020 | Soundrarajan |
| 2020/0272973 A1 | 8/2020 | Sun et al. |
| 2021/0026724 A1 | 1/2021 | Nadger et al. |
| 2021/0184940 A1 | 6/2021 | Andersson et al. |
| 2021/0201202 A1 | 7/2021 | Simhon |
| 2021/0234803 A1 | 7/2021 | Parekh et al. |
| 2021/0351973 A1 | 11/2021 | Ford et al. |
| 2021/0406146 A1 | 12/2021 | Lange et al. |
| 2022/0078071 A1 | 3/2022 | Agapitos et al. |

(Continued)

FOREIGN PATENT DOCUMENTS

WO    2020215282 A1    10/2020

OTHER PUBLICATIONS

International Search Report and Written Opinion issued Sep. 15, 2023 regarding International Application No. PCT/KR2023/002736, 6 pages.

(Continued)

*Primary Examiner* — Kent Krueger

(57) ABSTRACT

Methods and apparatuses for automating configuration management in cellular networks. A method of a UE comprises: training, based on historical samples, a regression model y using samples obtained from a set of parameters, wherein the regression model y comprises a function of a first term X and a second term h; and predicting, based on the regression model y, a target KPI to capture parameter impacts corresponding to the second term h.

20 Claims, 25 Drawing Sheets

(56) References Cited

U.S. PATENT DOCUMENTS

| | | |
|---|---|---|
| 2022/0210708 A1 | 6/2022 | Parekh et al. |
| 2022/0243133 A1* | 8/2022 | Sauer et al. |
| 2023/0047057 A1* | 2/2023 | Kurt .................... H04L 41/145 |
| 2023/0164049 A1* | 5/2023 | Samadi ................ H04W 16/22 |

OTHER PUBLICATIONS

Extended European Search Report issued Sep. 22, 2025 regarding Application No. 23912390.4, 16 pages.

Bojovic et al., "Machine learning-based dynamic frequency and bandwidth allocation in self-organized LTE dense small cell deployments", EURASIP Journal on Wireless Communications and Networking, vol. 2016, No. 1, Aug. 2016, 16 pages.

Wu et al., "CellPAD: Detecting Performance Anomalies in Cellular Networks via Regression Analysis", 2018 IFIP Networking Conference (IFIP Networking) and Workshops, May 2018, pp. 19-27.

\* cited by examiner

AUTOMATING CONFIGURATION MANAGEMENT IN CELLULAR NETWORKS

TECHNICAL FIELD

The present disclosure relates generally to communication systems and, more specifically, the present disclosure relates to automating configuration management in a wireless communication network.

BACKGROUND

5th generation (5G) or new radio (NR) mobile communications is recently gathering increased momentum with all the worldwide technical activities on the various candidate technologies from industry and academia. In current open radio access network (O-RAN) fronthaul network, the robustness of the underlying network is required and several ways for a message sender to detect transmission failure of messages over front-haul network or decoding failure of messages at receiver are provided.

SUMMARY

The present disclosure relates to communication systems and, more specifically, the present disclosure relates to automating configuration management in a wireless communication network.

In one embodiment, a network entity in a communication system is provided. The network entity comprises memory and a processor operably connected to the memory. The processor of the network entity is configured to: train, based on historical samples, a regression model y using samples obtained from a set of parameters, wherein the regression model y comprises a function of a first term X and a second term h, and predict, based on the regression model y, a target key performance index (KPI) to capture a parameter impact corresponding to the second term h.

In another embodiment, a method of a network entity in a communication system is provided. The method comprises: training, based on historical samples, a regression model y using samples obtained from a set of parameters, wherein the regression model y comprises a function of a first term X and a second term h; and predicting, based on the regression model y, a target KPI to capture a parameter impact corresponding to the second term h.

In yet another embodiment, a non-transitory computer-readable medium comprising program code is provided. The non-transitory computer-readable medium, that when executed by at least one processor, causes a network entity to: train, based on historical samples, a regression model y using samples obtained from a set of parameters, wherein the regression model y comprises a function of a first term X and a second term h, and predict, based on the regression model y, a target KPI to capture a parameter impact corresponding to the second term h.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical. or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 31, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

Figure 1:
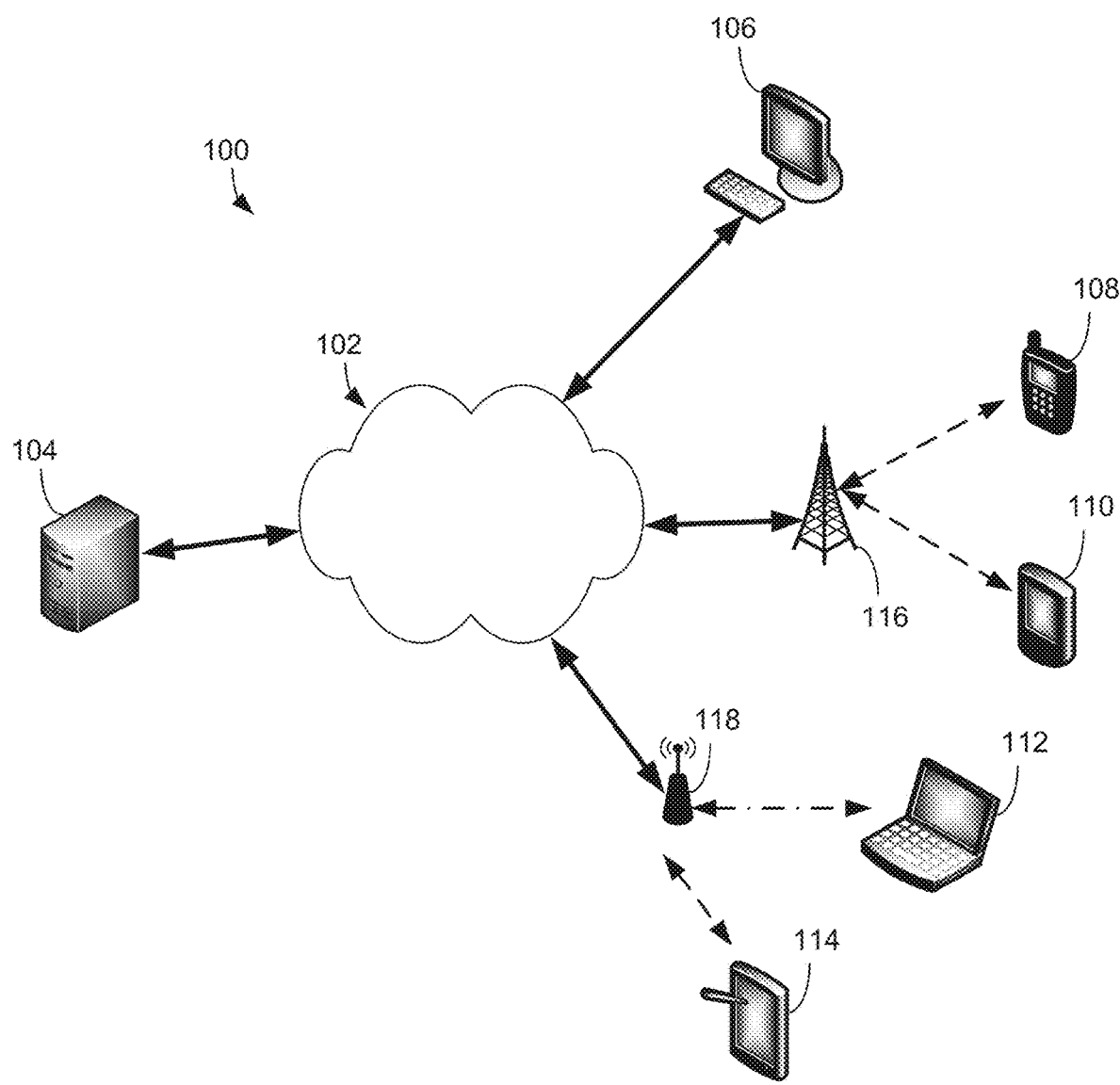
FIG. 1 illustrates an example of computing system according to embodiments of the present disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server (e.g., a network entity) 104 and various client devices 106-114 such as a user equipment (UE), a terminal, or any device including capability of communication. Each server 104 (e.g., a network entity) includes any suitable computing or processing device that can provide computing services for one or more client devices. Each server 104 (e.g., a network entity) could, for example, include one or more processing devices, one or more memories storing instructions and data, and one or more network interfaces facilitating communication over the network 102.

Each client device 106-114 represents any suitable computing or processing device that interacts with at least one server (e.g., a network entity) or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
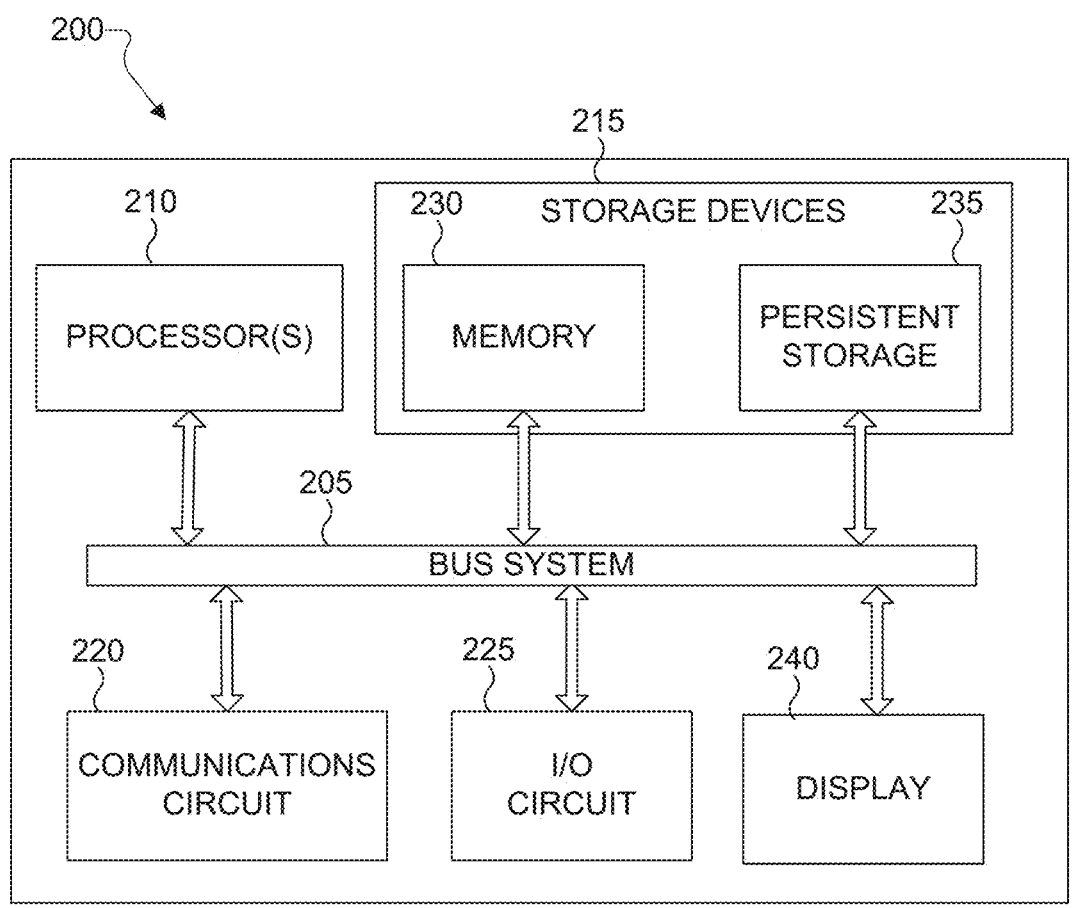
FIG. 2 illustrates an example of network entity according to embodiments of the present disclosure.

FIG. 2 illustrates an example of a network entity (e.g., network device) in a computing system according to this disclosure. In particular, FIG. 2 illustrates an example network entity 200 (e.g., a server, a network node). The network entity 200 could represent the network entity 104 in FIG. 1.

As shown in FIG. 2, the network entity 200 includes a bus system 205, which supports communication between at least one processor 210, at least one storage device 215, at least one communications circuit 220, and at least one input/output (I/O) unit 225.

The processor 210 executes instructions that may be loaded into a memory 230. The processor 210 may include any suitable number(s) and type(s) of processors or other devices in any suitable arrangement. Example types of processor 210 include microprocessors, microcontrollers, digital signal processors, field programmable gate arrays, application specific integrated circuits, and discreet circuitry. The processor 210 is also capable of executing other processes and programs resident in the memory 230, such as processes for automating configuration management in a wireless communication network.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications circuit 220 supports communications with other systems or devices. For example, the communications circuit 220 could include a network interface card or a wireless transceiver facilitating communications over the network 102. The communications circuit 220 may support communications through any suitable physical or wireless communication link(s).

The I/O circuit 225 allows for input and output of data. For example, the I/O circuit 225 may provide a connection for user input through a keyboard, mouse, keypad, touchscreen, or other suitable input device. The I/O circuit 225 may also send output to a display, printer, or other suitable output device.

The processor 210 is also coupled to the display 240. The display 240 may be a liquid crystal display or other display capable of rendering text and/or at least limited graphics, such as from web sites.

Note that while FIG. 2 is described as representing the server 104 (e.g., a network entity) of FIG. 1, the same or similar structure could be used in one or more of the client devices 106-114. For example, a laptop or desktop computer could have the same or similar structure as that shown in FIG. 2. The base stations come in a wide variety of configurations, and FIG. 2 does not limit the scope of this disclosure to any particular implementation of a base station.

Although FIG. 2 illustrates examples of a network entity (e.g., network devices) in a computing system, various changes may be made to FIG. 2. For example, various components in FIG. 2 could be combined, further subdivided, or omitted and additional components could be added according to particular needs. As a particular example, the main processor 340 could be divided into multiple processors, such as one or more central processing units (CPUs) and one or more graphics processing units (GPUs). In addition, as with computing and communication networks, client devices and servers (e.g., network entities) can come in a wide variety of configurations, and FIG. 2 does not limit this disclosure to any particular client device or network entity (e.g., server).

Size and complexity of today's cellular networks make their management highly challenging and costly for cellular operators. In cellular networks, a large volume of network is generated by network devices such as base stations, core network elements and end-user devices. This network data includes performance management (PM) data (often time-series data such as counters, performance metrics, and measurements), fault management (FM) data, such as alarm events that indicate a device has entered an erroneous state, and configuration management (CM) data, such as the configuration parameters and values of various network devices.

The CM data may include records of all configuration changes that have been made historically, which is referred to as a CM change log. To maintain good service quality for end-users, operators may continuously monitor network performance benchmarks, such as KPIs and key quality indicators (KQIs), for thousands of base stations and other devices in the network.

A typical 4G LTE cell has on the order of a thousand unique configuration parameters, with hundreds more added in the 5G new radio (NR) cells, which are configured and updated through a CM system. Configuration changes may be made by engineers or automatic background processes such as self-organizing network (SON) functions (e.g., the automatic neighbor relation (ANR) function or automatic primary cell ID (PCI) assignment function) in a legacy LTE system. Configuration changes are necessary in many cases, such as setting up a new cell deployment, remediating failures and faults, or optimizing the performance of a cell. For example, the antenna tilt may be adjusted to improve coverage or reduce interference to neighboring cells.

With thousands of base stations, each generating hundreds of KPIs, and alarms (amounting to hundreds of gigabytes of data each day), and with many configuration parameters, monitoring the network state, diagnosing faults such as caused by erroneous configuration changes, and optimizing the network performance via a proper parameter configuration require huge investments in time and human labor. Moreover, engineers often rely on experience and trial-and-error for configuration management in cellular networks, which may require several iterations of adjusting one or more parameters and observing the impact to network performance over a time period. Therefore, manual optimization of parameters may be imprecise, possibly leading to suboptimal performance. An intelligent CM analytics system is desired for an automated data-driven configuration management, which can speed up the inference and optimization processes, reduce the operational costs, and provide better quality of service for subscribers.

Figure 3:
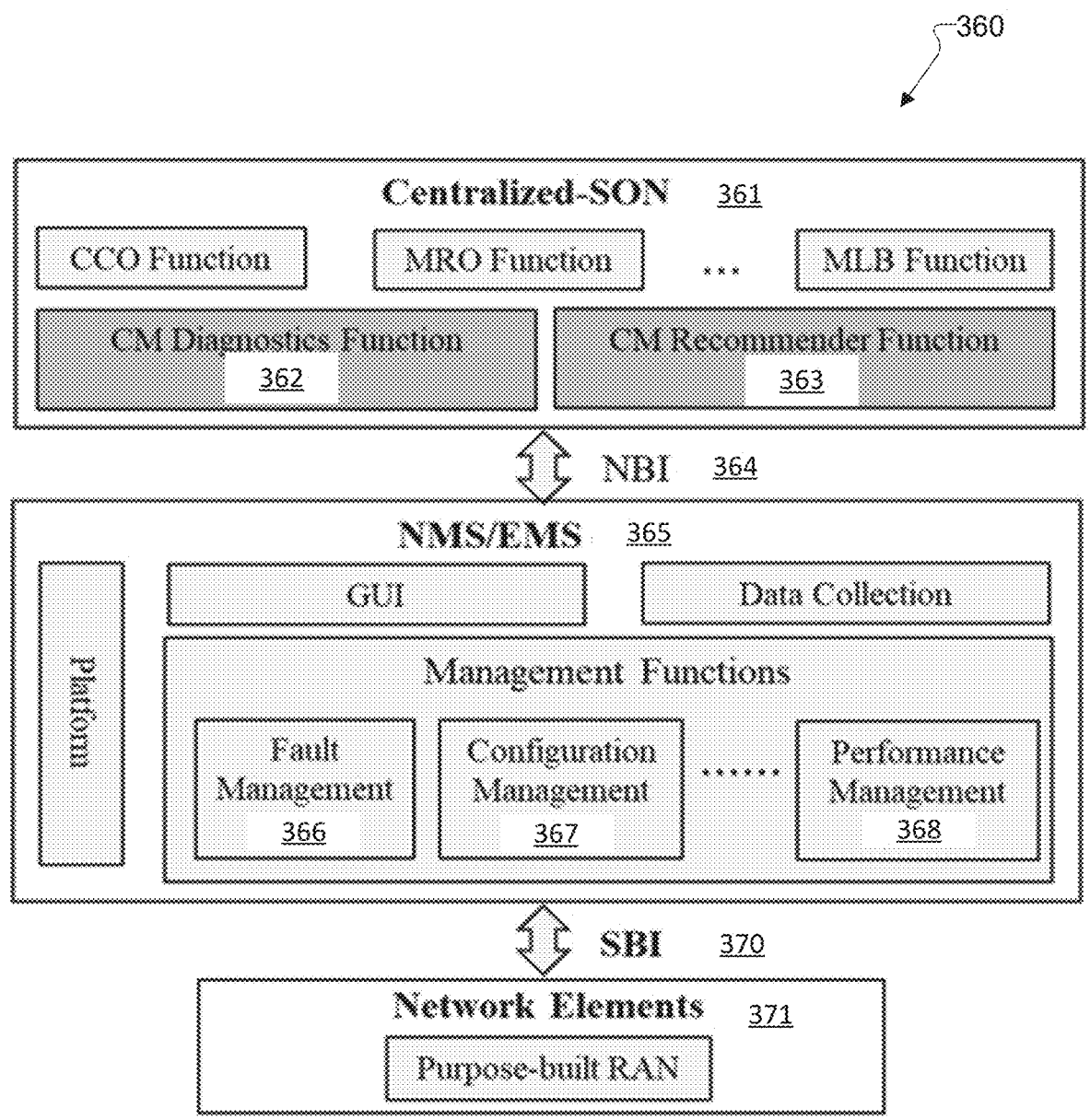
FIG. 3 illustrates an example of AI-based CM analytics solutions in an OAM system according to embodiments of the present disclosure.

FIG. 3 illustrates an example of AI-based CM analytics solutions in an OAM system 360 according to embodiments of the present disclosure. An embodiment of the AI-based CM analytics solutions in an operations, administration, and management (OA&M) system 360 shown in FIG. 3 is for illustration only.

As illustrated in FIG. 3, the roles of CM analytics functions include CM diagnostics and CM recommender functions in an example of a legacy network OA&M system, which includes carrier operations and supports systems (OSS), centralized self-organizing networks (C-SON), network management systems/element management systems (NMS/EMS) (365), network elements (NE) (371), northbound interface (NBI) (364), and southbound interface (SBI) (370).

In particular, the data source is the cellular network infrastructure, including radio access network (RAN) shown in network element (371). RAN data may include measurements, metrics and other data collected from base station (e.g., eNodeB or gNodeB) and UE devices. Data from RAN may be collected and aggregated at a data collection unit located at NMS/EMS (365) via SBI (370) by employing certain specific protocols such as simple network management protocols (SNMP). NMS/EMS performs several network functionalities including data collection function, management functions, GUI, and etc.

Management functions includes a set of components including fault management (FM) (365), configuration management (CM) (367), performance management (PM) (368), and etc. CM aims to control and monitor the configuration settings for NE and network resources (NR), and offers an interface to add, modify, and delete configuration information for NE and NR. CM data contains network configuration information such as parameter settings. PM aims to monitor, troubleshoot, and/or optimize networks including NE and NR. PM data contains a number of KPI counters for networks including NE and NR, which are essentially statistical information and historical logs indicating a network (NEs and NRs) performance.

Self-organizing networks (SON) includes a set of functions for automatic configuration, optimization, diagnostics and healing of cellular networks. Such functions not only include well-known SON functions such as coverage and capacity optimization (CCO), mobility robustness optimization (MRO), and mobile load balancing (MLB) proposed in 3GPP standard, but also other purpose-defined SON functions such as CM diagnostics functions (362), and CM recommender function (363). Centralized-SON (C-SON) provides a centralized architecture where the SON functions reside in EMS/NMS or a C-SON server that manages a group of NEs.

Northbound interface (NBI) (364) is an interface between EMS/NMS and C-SON server. In the legacy network OA&M system, SBI is primarily proprietary and thus in general NMS/EMS can only communicate with their proprietary NEs such as base stations. While NBI is designed to support multi-vendor multi-domain technologies, in reality it is very difficult to fully integrate NMS/EMS with other vendor's SON products due to the lack of agreement on interface specifications.

Figure 4:
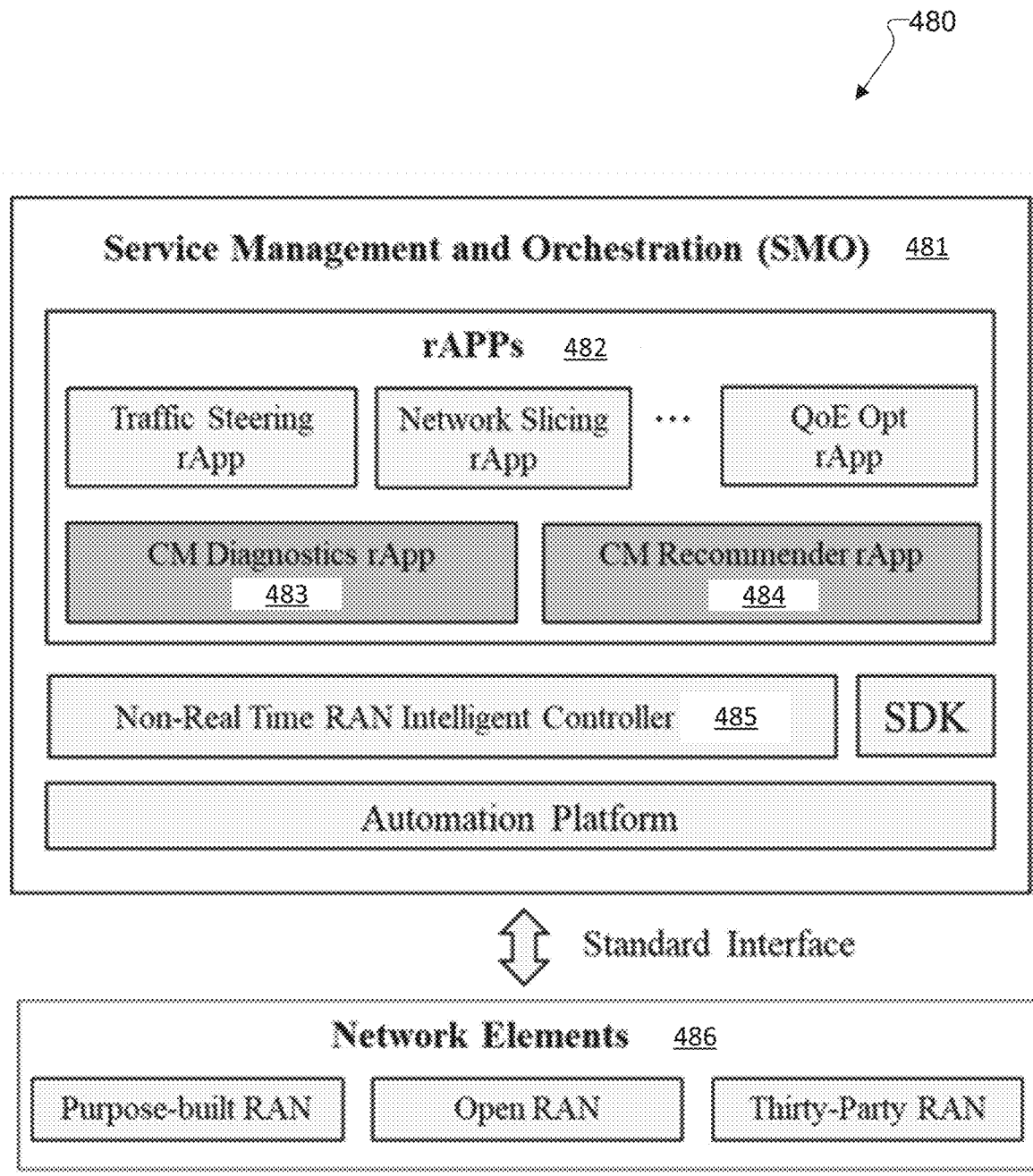
FIG. 4 illustrates another example of AI-based CM analytics solutions in an OAM system according to embodiments of the present disclosure.

FIG. 4 illustrates an example of AI-based CM analytics solutions in an OA&M system 480 according to embodiments of the present disclosure. An embodiment of the AI-based CM analytics solutions in an OA&M system 480 shown in FIG. 4 is for illustration only.

To overcome the deficiency of the legacy network OA&M system, as depicted in FIG. 4, an evolved network OA&M system based on service management and orchestration platform (SMO, 481) has been provided, where both NBI and SBI are standardized. Via standard interface between NEs and automation platform, RAN data is collected and aggregated at an automation platform at SMO. The SMO (481) is not just a simple integration of SON functionalities into a legacy NMS/EMS. The SMO (481) includes some important modules such as non-real-time RAN intelligent controller (NRT-RIC) (485), which manages and orchestrates software applications e.g., rApps (482), which is NRT-RIC applications. Essentially, SMO can be viewed as next generation of NMS/EMS that leverages AI/ML technologies to enable closed-loop network automation.

In particular, as a core module in SMO, rApps that are operated by NRT-RIC, are designed to realize various network automation use cases. Due to the openness and programmability offered in SMO including software development kit (SDK), the development of rApps will not be a privilege of network equipment vendors and service providers but will open to other technology business such as startup. Intelligent CM analytics rApps including CM diagnostics rApp and CM recommender rApp are designed to automatically identify CM misconfigurations and recommend an appropriate parameter setting for network KPI improvement. FIG. 4 illustrates the role of CM analytics functions in an evolved network OA&M system.

The outcome of CM diagnostics and CM recommender functions can be used for network engineers to take further actions such as correction of CM misconfiguration and/or recommendation of a better parameter setting.

Figure 5:
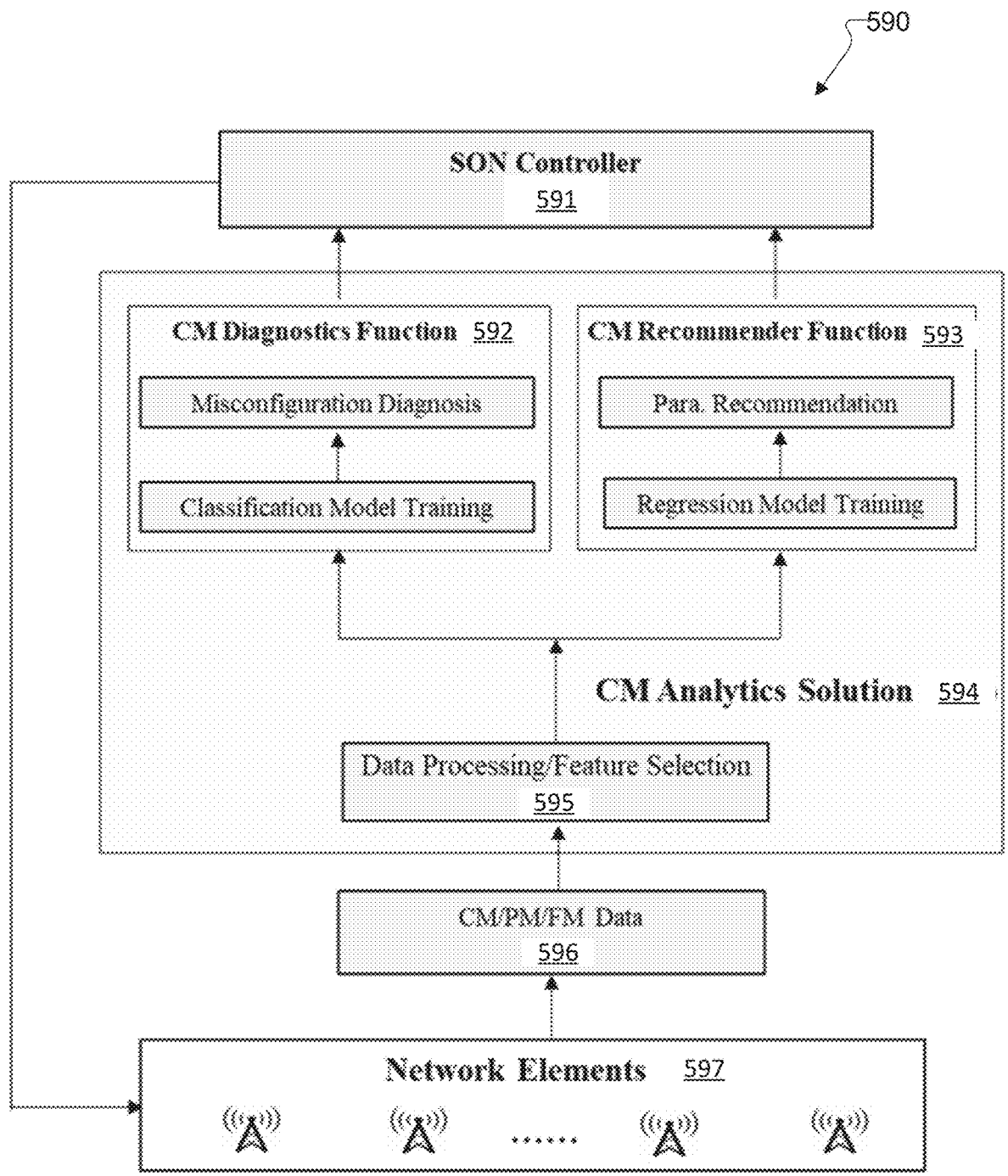
FIG. 5 illustrates an example of AI-based CM analytics solution architecture according to embodiments of the present disclosure.

FIG. 5 illustrates an example of AI-based CM analytics solution architecture 590 according to embodiments of the present disclosure. An embodiment of the AI-based CM analytics solution architecture 590 shown in FIG. 5 is for illustration only.

NMS/EMS collects data from network elements (NEs) via certain specific protocols, which can be proprietary or standard protocols such as simple network management protocols (SNMP). A management function located at NMS/EMS consists of a set of components including fault management, configuration management, performance management and etc. In particular, CM aims to control and monitor the configuration settings for network elements (NE) and network resources (NR), and offers an interface to add, modify, and delete configuration information for NE and NR. CM data contains network configuration information such as parameter settings. PM aims to monitor, troubleshoot, and/or optimize networks including NE and NR. PM data contains a number of key performance indicator counters for networks including NE and NR, which are essentially statistical information and historical logs indicating a network (NEs and NRs) performance. FM traditionally includes fault detection, generation of alarms, clearing of alarms, alarm forwarding and filtering, storage and retrieval of alarms, correlation of alarms and events, alarm root cause analysis and fault recovery. FM data contains alarm information generated from networks.

As illustrated in FIG. 5, CM analytics solutions (594) include a few CM related modules including data processing and features selection tailored for CM applications (595), a CM diagnostics function (592), and a CM recommender function (593).

The data processing/feature selection 595 may include, but is not limited to: (1) removing invalid data samples, (2) normalizing or scaling the data, (3) removing trends and seasonality in time-series data, (4) generating additional synthetic features from the existing KPIs and other fields in the data, (5) selecting a subset of the data samples or fields, such as a specific timeframe or a group of network devices, and (6) merging the PM/FM and CM data into a combined data set, for example, by matching the eNodeB/gNodeB ID and cell number fields and the timestamp of entries in the PM/FM data and the CM data.

As an example, the data processing/feature selection 595 may include the following steps. In one example, data cleaning and filtering are provided. In this step, the non-busy hour data, weekend data, and US holiday data are filtered and the data corresponding to outliers and missing values is removed. The busy hours are defined as from 8:00 am to 21:00 pm; weekend includes Saturday and Sunday; US holidays can be selected by using a Python built-in function holidays.US( ) from holidays package. Outliers can be identified by statistical outlier detection techniques or based on predetermined thresholds on KPIs. The missing values may include "NA" and "NaN" values.

In one example, synthetic KPI generation is provided. In this step, certain sets of synthetic KPIs are generated using the available KPIs from raw PM data. For example, the cumulative distribution of each KPI is generated.

Figure 6:
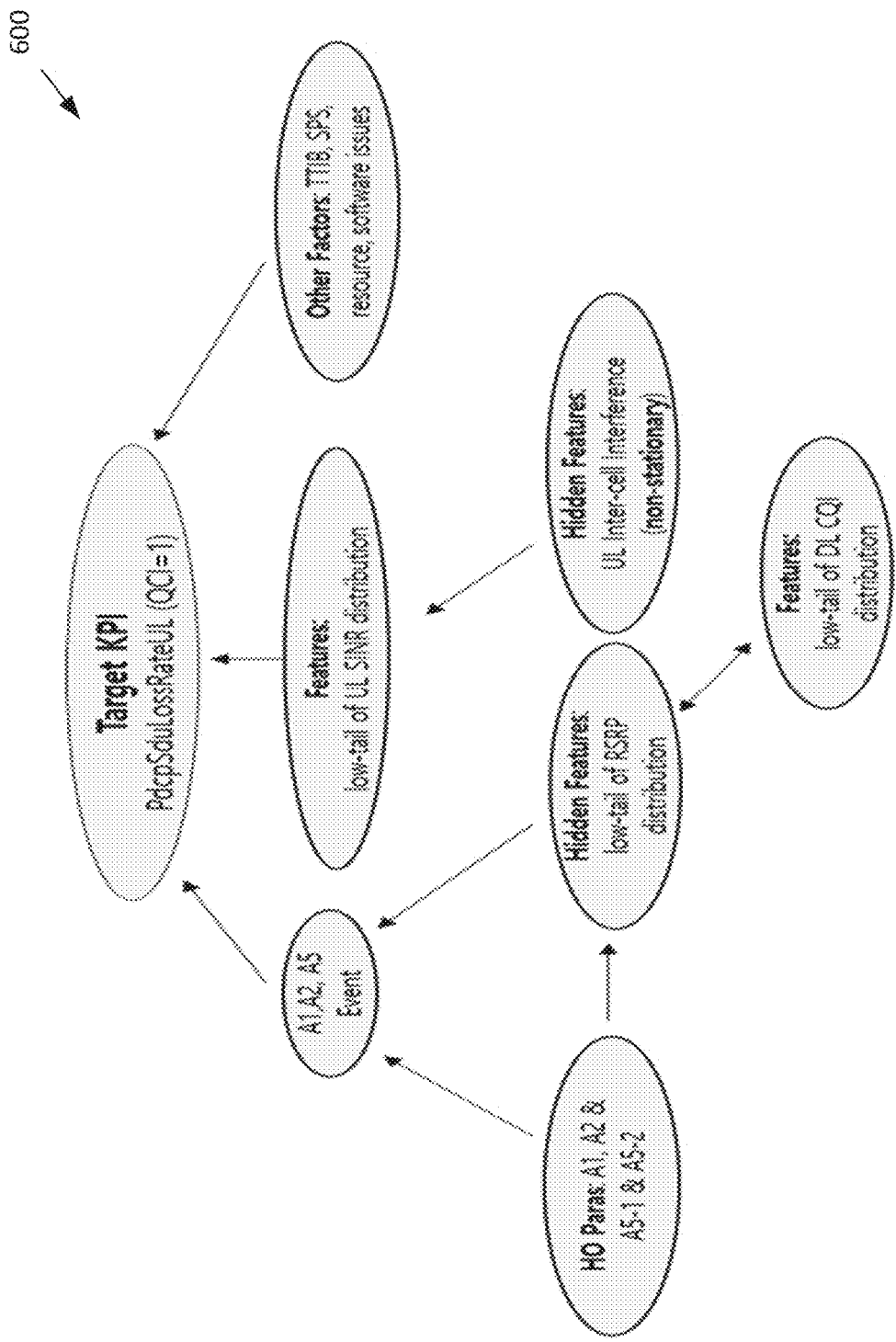
FIG. 6 illustrates an example of causality graph built using domain knowledge according to embodiment of the present disclosure.

FIG. 6 illustrates example of causality graph built using domain knowledge 600 according to embodiment of the present disclosure. An embodiment of the causality graph built using domain knowledge 600 shown in FIG. 6 is for illustration only.

FIG. 6 depicts a causality graph constructed using domain knowledge for a VoLTE uplink packet loss rate optimization case. As can be seen from the figure, parameters and features (regressors) that have large impacts on the target KPI are identified using domain knowledge. After this step is done, an operation only keeps the selected KPIs in the PM data. Note that the number of the selected KPI after this step can be still large due to the fact that domain-knowledge based feature selection methods are typically reliable since they depend on engineering physics but are very coarse if it is difficult to quantity the impacts of features. In the following two steps, an operation performs additional filtering to remove redundant features to improve model performance and model training efficiency.

In a feature selection operation for masking effect mitigation, in this step, an operation aims to remove any features (e.g., KPIs) that are highly impacted by the parameter settings to mitigate so called parameter masking effects from the remaining features). In other words, strong causality relationship between features and parameter settings may be avoided. Particularly, the features (regressors) used to train the classification models in parameter diagnostics, and the regression models in parameter recommender (360) functions may not be highly impacted by the parameters (configurations) of our interest. Otherwise, the accuracy of the regression models may suffer due to parameter masking effects.

In a feature selection operation for model training efficiency improvement, the primary purpose of performing feature selection is to improve efficiency of model training and prediction without having much model performance degradation. To achieve this goal, an operation needs to select a certain number of features that have relatively large impacts on the target KPI. In the following, an operation provides detailed descriptions on the feature selection procedure.

In one embodiment of step 1, based on engineering domain knowledge, an operation first uses causality graph built using domain knowledge to filter out some features (regressors) highly impacted by parameter settings. To be specific, an operation selects features (regressors) satisfying the following two conditions: 1) selected features have no strong causality relationship with tuning parameters, and 2) selected features (called B) may not have the following causation relationship with the target KPI (called A): A (target KPI) may not cause B (selected features) and A (selected features) and B (target KPI) may not be caused by a common C.

In one embodiment of step 2, an operation calculates the pairwise correlations (e.g., Pearson correlation or Kendall rank correlation) with proxy variables (KPI features) for each remaining feature (regressor) from the above step, which refers to the variables that are highly impacted by parameter settings. An operation ranks the remaining features from Step 1 based on the absolute values of the calculated pairwise correlation coefficients (e.g., the absolute values of the Pearson correlation coefficients) from largest to smallest, and an operation then filter out the features (regressors) that rank top N features with N denoting a design parameter.

In one embodiment of step 3, the Pearson correlation coefficients between the remaining selected features from Step 2 and the target KPI using data samples are computed at a cell level as follows:

$$r_{xy,c} = \frac{\sum_{i=1}^{N}(x_i - \bar{x})(y_i - \bar{y})}{\sqrt{\sum_{i=1}^{N}(x_i - \bar{x})^2}\sqrt{\sum_{i=1}^{N}(y_i - \bar{y})^2}}$$

where $r_{xy,c}$ denotes the Pearson coefficient at a cell with c denoting "cell." Next, an operation ranks the selected features from Step 2 based on the Pearson coefficients from highest to lowest values, i.e., the first element in the ranked feature list has the largest Pearson coefficient. An operation calls the ranked feature list, List1 and an operation uses List1[i] to denote the i-th element in the list. Some of these features may be highly linearly correlated, i.e., strong multicollinearity may occur among these features.

In one embodiment of step 4, an operation tries to obtain a set of features that have much reduced multicollinearity and similar prediction power for the target KPI as compared with the selected features from Step 3. To this end, an operation starts with the ranked feature list from Step 3 and select features iteratively. An operation next describes the procedure in detail in FIG. 7.

Figure 7:
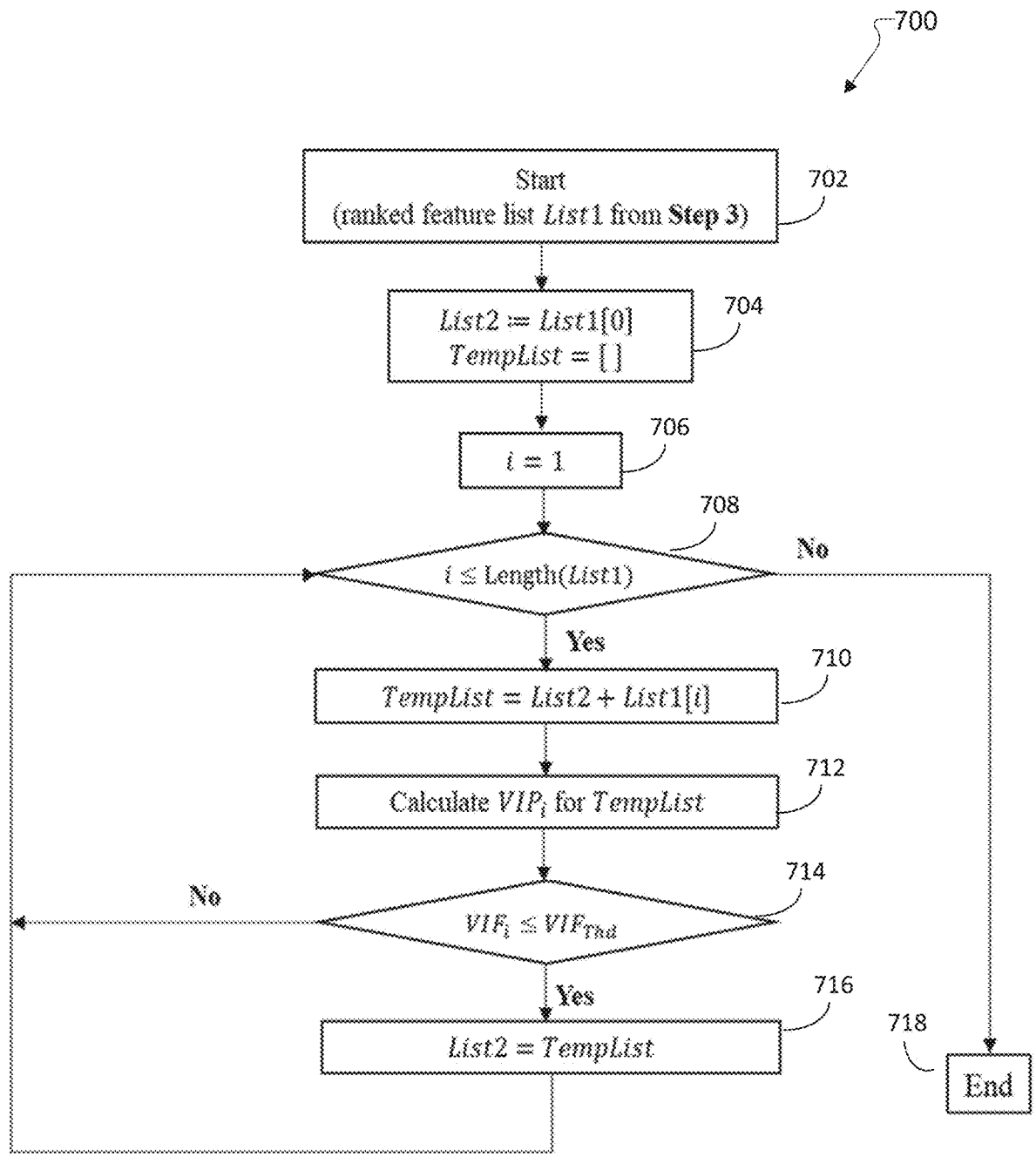
FIG. 7 illustrates a flowchart of a method for selecting procedure according to embodiment of the present disclosure.

FIG. 7 illustrates a flowchart of a method 700 for selecting procedure according to embodiment of the present disclosure. The method 700 as may be performed by a network entity (e.g., network 102, 104, 116, 118, and 200 as illustrated in FIG. 2) and/or a client device (e.g., 106-114 as illustrated in FIG. 1). An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As illustrated in FIG. 7, the method 700 begins at step 702. In step 704, the method identifies List 2 and Templist. Subsequently, in step 706, the method set i to one. Subsequently, in step 708, the method determines whether i is less than or equal to Length (List 1). In step 708, if yes, perform step 710. In step 708, if no, the method performs step 718. In step 710, the method sets TempList to List2+List1[i] and in step 720, the method calculates VIFi for TempList, where VIF refers to a variance inflation factor (VIF). Next, in step 714, the method determines whether VIFi is less than or equal to VIFThd. In step 714, if yes, the method performs step 716. In step 714, if no, the method performs step 708 again. In step 716, the method sets List2 to TempList and performs step 708 again.

The output of the selected feature list from this stem is termed as List2. In particular, VIF is used to quantify the severity of multicollinearity in an ordinary least squares regression analysis. An operation uses VIF_thd to determine if a newly added feature List[if] may cause severe multicollinearity to the existing selected feature list List2. VIF_thd is chosen to be 10 in our testing case.

In one embodiment of step 5, in the Step 4, an operation applies random forest (RF)-based permutation importance to rank feature importance from largest to smallest. An operation selects top K features of List2 based on the values of feature importance scores, where the value of K is selected based on the availability of computational power and time available for training the models.

Due to the high complexity of today's cellular networks, whenever a configuration change is made by either engineers or automated processes, there is a potential for errors to be introduced, which may inadvertently result in faults and KPI performance degradation. To ensure proper network operation, cellular operators may keep track of the configuration changes and perform diagnosis on whether KPI degradation is due to CM misconfigurations.

Figure 8A:
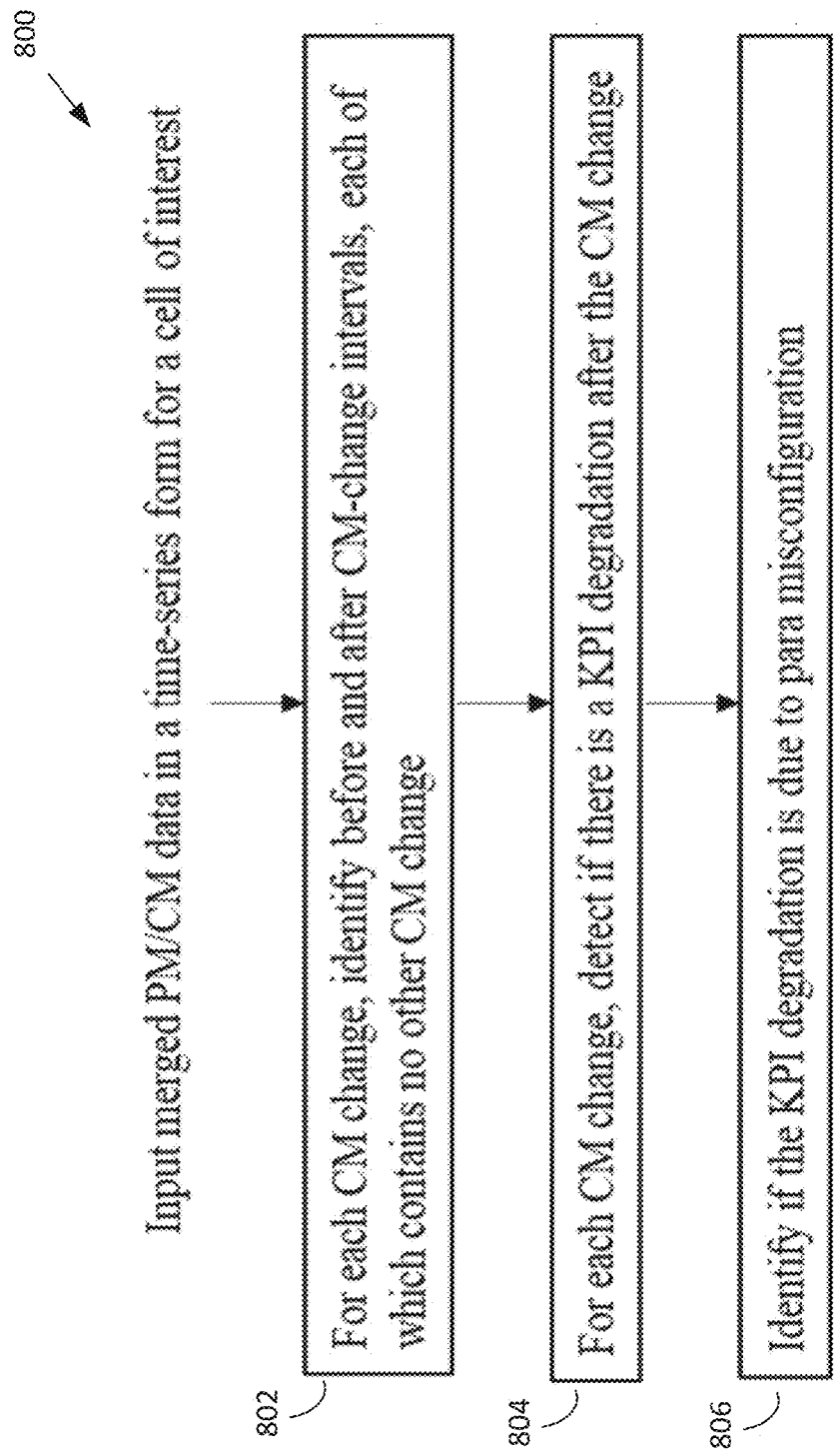
FIG. 8A illustrates a flowchart of a method for CM misconfiguration identification APP solution architecture according to embodiment of the present disclosure.

FIG. 8A illustrates a flowchart of a method 800 for CM misconfiguration identification APP solution architecture according to embodiment of the present disclosure. The method 800 as may be performed by a network entity (e.g., network 102, 104, 116, 118, and 200 as illustrated in FIG. 2) and/or a client device (e.g., 106-114 as illustrated in FIG. 1). An embodiment of the method 800 shown in FIG. 8A is for illustration only. One or more of the components illustrated in FIG. 8A can be implemented in specialized circuitry configured to perform the noted functions or one or more of the components can be implemented by one or more processors executing instructions to perform the noted functions.

FIG. 8A depicts the high-level solution architecture of the CM misconfiguration identification APP. In operation (802), the PM and CM time-series data collected from a cell of interest are split into intervals based on the configuration changes. In particular, for each configuration change, the before and after intervals are identified such that no other configuration changes happen within these intervals as depicted in FIG. 8A.

In operation (804), the before and after intervals are analyzed to detect if there is a performance degradation after configuration change (i.e., anomaly detection). In operation 806, if there is a performance degradation, the before and after intervals are analyzed to decide if the performance degradation is caused by the CM misconfiguration change as mentioned in embodiment of the present disclosure.

In one embodiment, an operation provides a CM diagnostics solution based on a binary classification model. In this model, an operation provides to use proxy variables to capture impacts of certain parameter settings. Proxy variables refer to the variables that reflect impacts of the parameter settings directly. Unlikely target KPI that are impacted by many factors, proxy variables are primarily impacted by parameter settings along with some potential hidden variables. The use of proxy variables aims to help the model to capture the impacts of parameter tuning.

In one embodiment of step 1, for a CM-change at cell level, an operation first identifies if there is a significant target KPI change between before and after a CM-change in terms of anomaly score. In the following, an operation describes how to calculate an anomaly score. First, an operation defines two options for selecting a sample-wise anomaly score function as follows.

Figure 8B:
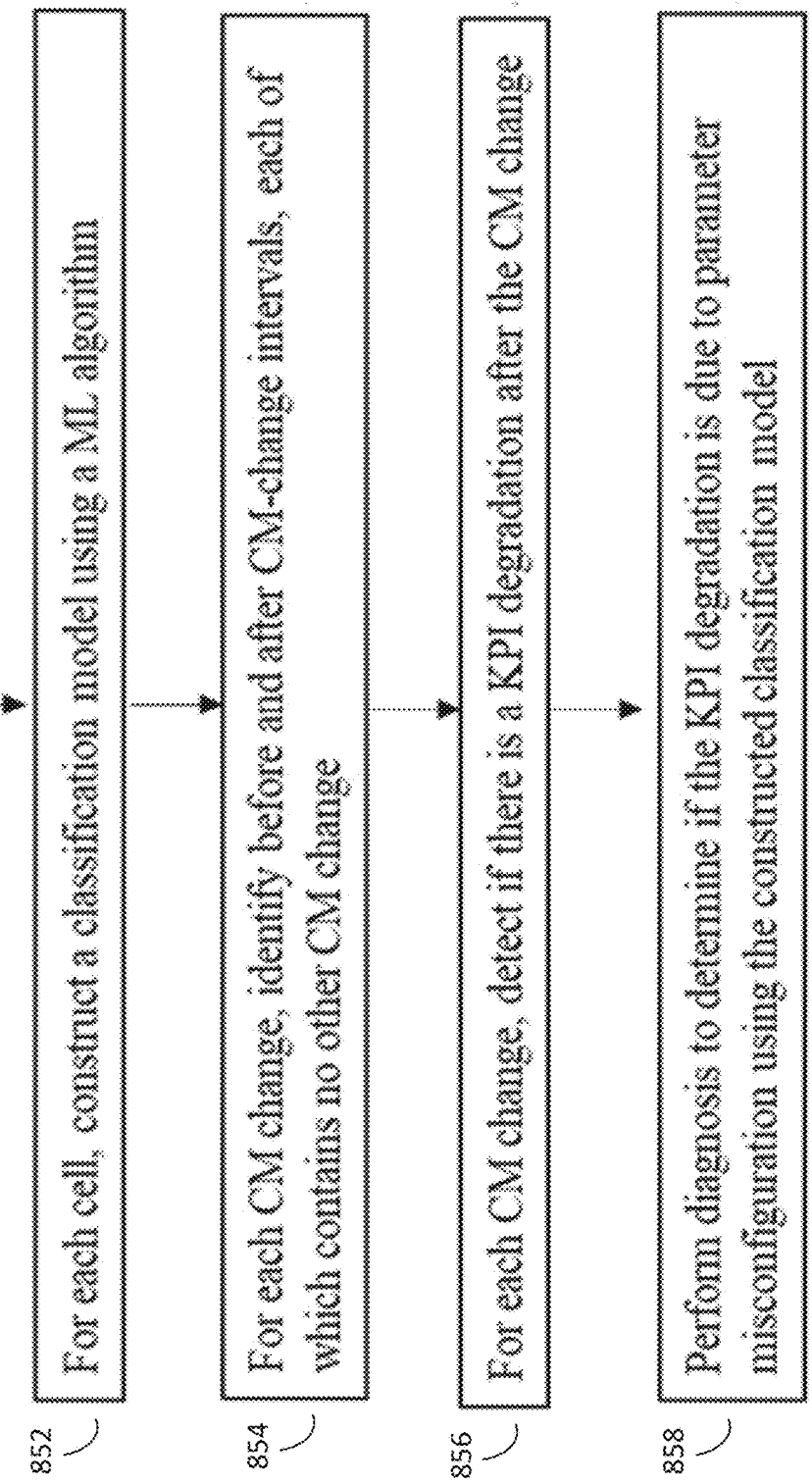
FIG. 8B illustrates a flowchart of a method for CM diagnostic solution architecture according to embodiment of the present disclosure.

FIG. 8B illustrates a flowchart of a method 850 for CM diagnostic solution architecture according to embodiment of the present disclosure. The method 850 as may be performed by a network entity (e.g., network 102, 104, 116, 118, and 200 as illustrated in FIG. 2) and/or a client device (e.g., 106-114 as illustrated in FIG. 1). An embodiment of the method 850 shown in FIG. 8B is for illustration only. One or more of the components illustrated in FIG. 8B can be implemented in specialized circuitry configured to perform the noted functions or one or more of the components can be implemented by one or more processors executing instructions to perform the noted functions.

Figure 9:
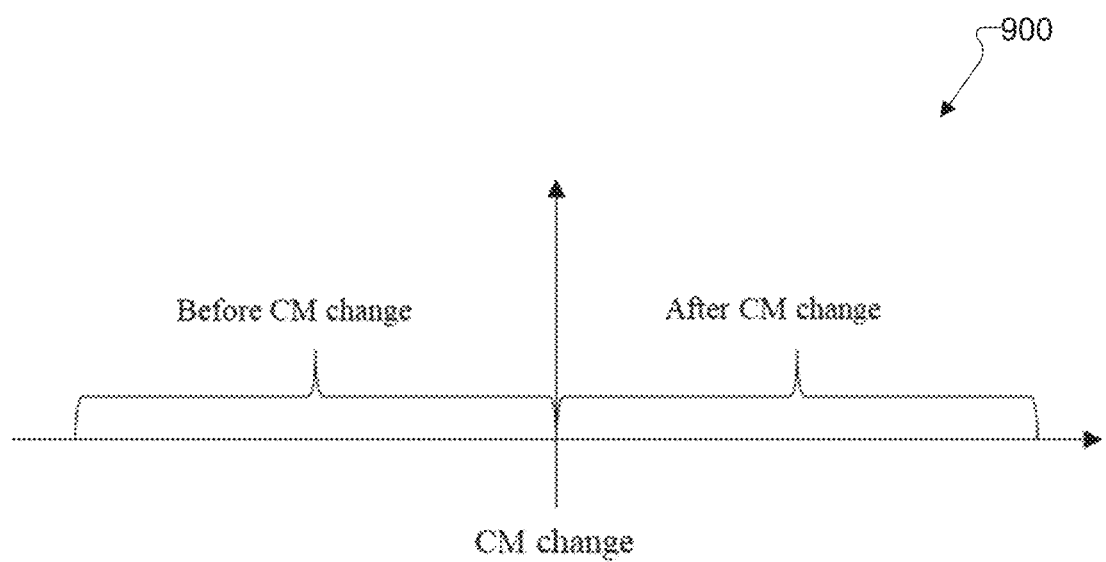
FIG. 9 illustrates an example of classification-based CM misconfiguration solution with proxy variables according to embodiments of the present disclosure.

FIG. 8B illustrates the high-level solution architecture of the CM diagnostics function. In step 852, a classification model using a ML algorithm (e.g., random forest) is constructed. In step 854, the PM and CM time-series data collected from a cell of interest are split into intervals based on the configuration changes. In particular, for each configuration change, the before and after intervals are identified such that no other configuration changes happen within these intervals as depicted in FIG. 9. In step 856, the before and after intervals are analyzed to detect if there is a KPI performance degradation after configuration change (i.e., anomaly detection). In step 858, if there is a KPI performance degradation between the before and after intervals, CM diagnosis is performed to determine if the performance degradation is caused by the CM misconfiguration change.

FIG. 9 illustrates an example of classification-based CM misconfiguration solution with proxy variables 900 according to embodiments of the present disclosure. An embodiment of the classification-based CM misconfiguration solution with proxy variables 900 shown in FIG. 9 is for illustration only.

In one example of option 1, a sample-wise anomaly score function is provided:

$$s(KPI_t) = \begin{cases} 1 \text{ (anomaly)} & \text{if } KPI_t > Thd \\ 0 \text{ (normality)} & \text{if } KPI_t \leq Thd \end{cases}$$

where Thd denotes a threshold that is used to determine anomaly. The value of Thd may vary from cell to cell and may be obtained by using the statistics of target KPI from historical data or by using engineering domain knowledge.

In one example of option 2, a sample-wise anomaly score function is provided:

$$s(KPI_t) = \begin{cases} 1(\text{anomaly}) & \text{if } KPI_t > \text{Median}(KPI_t) + H\beta \\ 0(\text{normality}) & \text{if } KPI_t \leq \text{Median}(KPI_t) + H\beta \end{cases}$$

where $\beta$ denotes the mean absolute deviation defined as $$\beta = \frac{1}{N}\sum_{t=1}^{N} |KPI_t - \text{Median}(KPI_t)|,$$

and H is a constant that is selected based on the statistical distribution of $KPI_t$ or engineer domain experience, e.g., H=3. Next, an operation define a cumulative anomaly score function before a CM change and after a CM change, respectively as follows:

$$B(T_b) = \frac{1}{N_s}\sum_{t \in T_b} s(KPI_t) \text{ and } A(T_a) = \frac{1}{N_s}\sum_{t \in T_a} s(KPI_t),$$

where $T_b$ and $T_a$ denote the period of time before and after a CM change, respectively. Note an operation assumes that the cardinalities of $T_b$ and $T_a$ are the same, i.e., $|T_a|=|T_b|=N_s$. An operation selects $T_b$ and $T_a$ as close as possible to the corresponding CM change in order to mitigate the impacts on the target KPI due to variations of other factors.

An operation first computes the ratio between the values of before and after cumulative anomaly score functions, and then an operation compares it with two thresholds $Ab_{thd}$ and $1/Ab_{thd}$ to identify if there is a significant change on the target KPI before and after CM change:

$$r_{Ab} = \frac{A(T_a)}{B(T_b)} = \begin{cases} \geq Ab_{thd} & \text{significant change} \\ 1/Ab_{thd} & \text{significant change} \\ \text{otherwise} & \text{no significant} \end{cases}$$

The dramatic change in cumulative anomaly scores is only necessary condition to associate target KPI change (either degradation or improvement) with a CM change. Note that anomalies defined in our context are different from the commonly used definition in literature, where anomalies refer to very rare events. Thus, the thresholds used our anomaly detection (AD) in option 1 or option 2 are carefully selected to reflect KPI changes. An operation next provides an RCA solution to further quantify how likely the CM change is actual root cause for the target KPI change.

In one embodiment of step 2, an operation identifies if there is a distribution change in proxy variables. If there is no dramatic shift on any of these proxy variables after a CM change, it implies that the CM change does not take effects and thus has no impact on the target KPI. Therefore, an operation can infer that the dramatic shift of the target KPI between before and after the CM change is unlikely to be caused by the CM-change. The issue of how to identify the distribution change for handover related KPIs is important. An operation resorts to the hypothesis testing to decide whether it was likely different data sets were generated by the same distribution, where the Null hypothesis $H_0$ states that two samples are from the same distribution. An operation provides the following non-parametric hypothesis tests: (1) Anderson-Darling test, (2) Kolmogorov-Smirnov test, and (3) Mann-Whitney U test.

As an illustrative example, an operation performs the above three two sample tests for a proxy variable and computes their corresponding p-values as shown in TABLE 1.

TABLE 1 p-values of three two-sample tests

| Test | p-value |
|---|---|
| Anderson-Darling Test | 3.03568e−28 |
| Kolmogorov-Smirnov Test | 1.91558e−22 |
| Mann-Whitney U Test | 3.62589e−26 |
| Max p-value | 1.91558e−22 |

As can be seen from TABLE 1, all three tests have very small p-value, which indicates the distributions of the proxy variable before and after a CM-change are not the same.

In one embodiment of step 3, in Step 2, an operation determines that a KPI degradation is unlikely to be caused by the CM change if none of proxy variables has distribution changes between before and after CM-change intervals. In this step, an operation provides a model based approach to identify how likely a KPI degradation is due to a CM-change when one of these proxy variables has distribution changes between before and after CM-change intervals.

In a model based approach, an operation assumes that there exists an unknown functional relationship between the target KPI and the features/parameters as described as follows: y=$f$(X,p) where y, X, and p denote a target KPI to be optimized (e.g., DL throughput), feature KPIs, and the parameters, respectively.

In the CM diagnostic solution (592) and CM recommender solution (593), an operation builds KPI models to predict KPI for different combinations of the feature KPIs X and the parameters.

Particularly, in the CM diagnostic solution, an operation focuses on predicting KPI anomalies instead of predicting exactly y value. To this end, an operation constructs a binary classification model as follows: Y=$f$(X,h) where X denotes the selected features (regressors) from PM counters, h denotes proxy variables that are directly impacted by parameter tuning, and Y is a binary label defined by using option 1 or option 2 in step 1 described above. In particular, the features (regressors) X are obtained from the provided feature selection solution. To construct the classification model $f$(X,h), an operation uses the historical data before a CM change and at most N data samples after the CM change (e.g., N typically is equal to the number of data samples collected over a period of time after the CM change.) The larger the N value, the longer the data collect period. To maintain work efficiency, the data collection period after a CM change may not be too long (e.g., one day or two days). Since the length of the before CM change interval is much larger than that of the after CM interval, an operation oversamples the after CM data samples to mitigate the imbalanced data issue in our model training.

Figure 10:
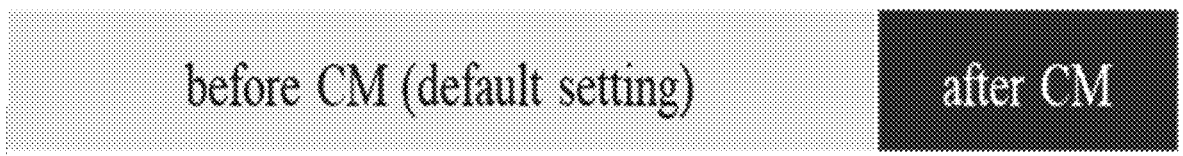
FIG. 10 illustrates an example of data periods used for model construction according to embodiments of the present disclosure.

FIG. 10 illustrates an example of data periods used for model construction 1000 according to embodiments of the present disclosure. An embodiment of the data periods used for model construction 1000 shown in FIG. 10 is for illustration only.

TABLE 2 depicts an illustration of the classification model performance for a particular cell. As illustrated in TABLE 2, the classification model performance can achieve roughly 90% F1 score.

TABLE 2

Classification model prediction performance

| ENBID/CELLID | Precision | Recall | F1 score |
|---|---|---|---|
| Enb_id/Cell_id | 84% | 95% | 89% |

Figure 11:
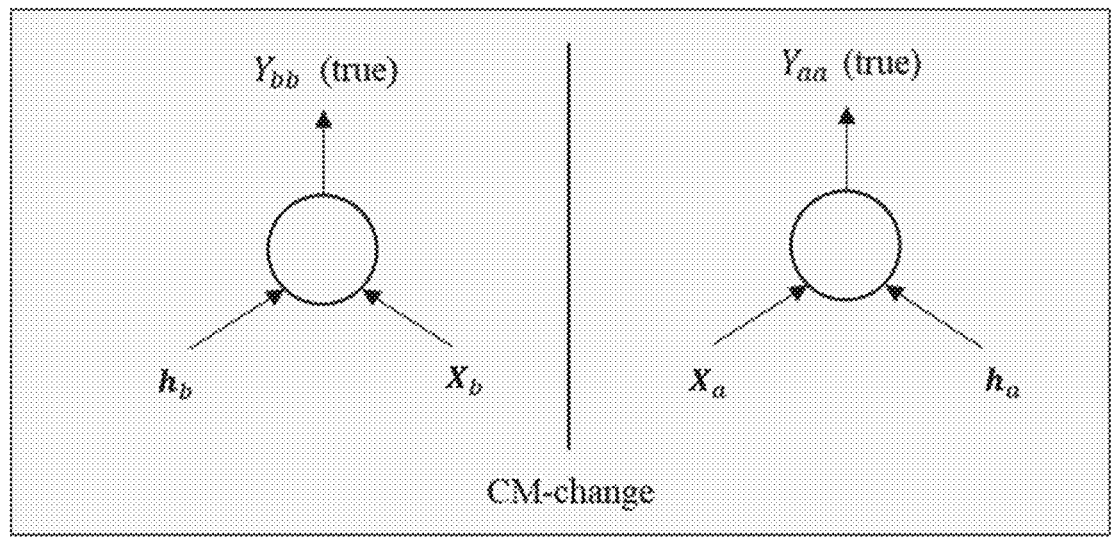
FIG. 11 illustrates an example of impacting factors on the target KPIs before and after a CM change according to embodiments of the present disclosure.

A primary challenge for identifying the root cause for target KPI shift is that the target KPI is impacted by X and h jointly and in general the impacts of X on the target KPI is much larger than h reflecting the CM change, as illustrated in FIG. 11, where $Y_{bb}$ and $Y_{aa}$ denote the true KPI labels of before and after CM change respectively, $X_a$ and $X_b$ denote the feature KPIs of before and after CM change respectively, and $h_a$ and $h_b$ are proxy variables of before and after CM change respectively.

FIG. 11 illustrates an example of impacting factors on the target KPIs before and after a CM change 1100 according to embodiments of the present disclosure. An embodiment of the impacting factors on the target KPIs before and after a CM change 1100 shown in FIG. 11 is for illustration only.

If an operation were able to "fix" other factors X before and after a CM change, then an operation may have isolated the impacts of handover parameters related factors h and further an operation can identify if the CM change is root cause for KPI shift. In reality, an operation is not able to have constant X before and after a CM since X are always changing. Instead, an operation uses the predicted Y for the same input X with different h inputs, as depicted in FIG. 12 and FIG. 13.

Figure 12:
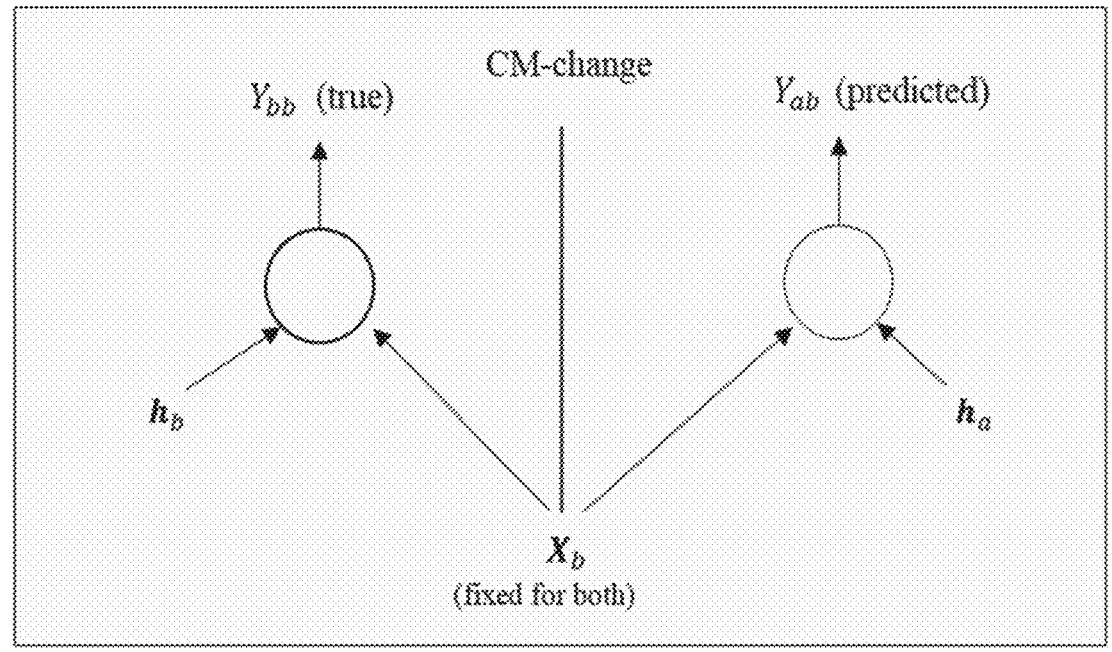
FIG. 12 illustrates an example of fixed feature X before the CM change (X_b) according to embodiments of the present disclosure.

FIG. 12 illustrates an example of fixed feature X before the CM change (X_b) 1200 according to embodiments of the present disclosure. An embodiment of the fixed feature X before the CM change (X_b) 1200 shown in FIG. 12 is for illustration only.

Figure 13:
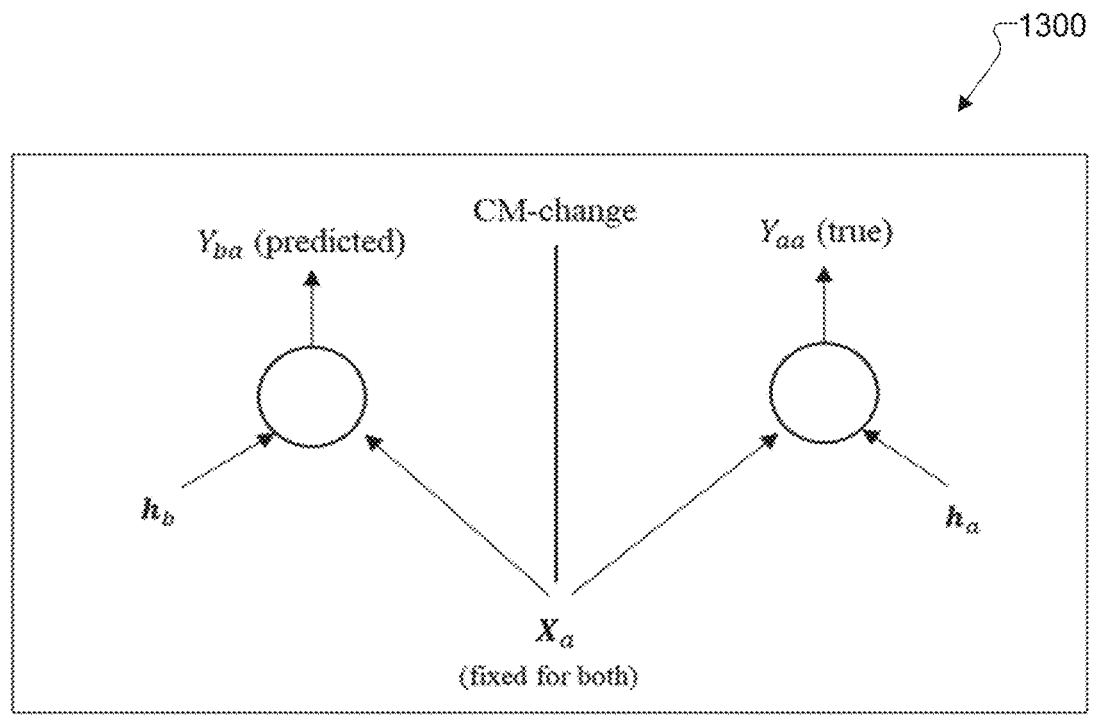
FIG. 13 illustrates an example of fixed feature X after the CM change (X_a) according to embodiments of the present disclosure.

FIG. 13 illustrates an example of fixed feature X after the CM change (X_a) 1300 according to embodiments of the present disclosure. An embodiment of the fixed feature X after the CM change (X_a) 1300 shown in FIG. 13 is for illustration only.

As illustrated in FIGS. 11-13, an operation use X collected over the period of time before a CM change, (e.g., N=60, 120, or 180 samples immediately before a CM change) and Z collected over the period of time before and after the CM change (e.g., N=60, 120, or 180 samples immediately before and immediately after the CM change). As illustrated in FIG. 12, an operation has:

$$\begin{cases} Y_{bb} = f(X_b, h_b) \\ Y_{ab} = f(X_b, h_a) \end{cases}$$

and similarly as illustrated in FIG. 13, an operation has $$\begin{cases} Y_{ba} = f(X_a, Z_b) \\ Y_{aa} = f(X_a, Z_a) \end{cases}.$$

In one embodiment of step 4, an operation computes so called anomaly samples $N_{ab}$ after a CM change and anomaly samples $N_{bb}$ before a CM change. Note that in the above notation, the first subscript indicates over which period (before or after a CM change) the parameter related KPIs Z are used, and the second subscript indicates over which period (before or after a CM change) the KPIs X are used. As mentioned earlier, the total number of data sample N collected over a period of time before or after a CM change is the same. Next, an operation defines the relative differences between the numbers of anomaly samples over the periods of time before and after a CM change as follows:

$$Rd_b = \frac{|N_{ab} - N_{bb}|}{N_{bb}} \text{ (before)} \qquad \text{Equation 4-1}$$

$$Rd_a = \frac{|N_{ba} - N_{aa}|}{N_{aa}} \text{ (after)} \qquad \text{Equation 4-2}$$

and the absolute differences between the numbers of anomaly samples over the periods of time before and after a CM change as follows:

$$Ad_b = |N_{ab} - N_{bb}| \text{ (before)} \qquad \text{Equation 4-3}$$

$$Ad_a = |N_{ba} - N_{aa}| \text{ (after)}. \qquad \text{Equation 4-4}$$

Note that the above metrics reflect the target KPI shift before and after a CM change, which are obtained by fixing the KPIs X. Recall that the KPIs X is selected to have no causality relationship with parameter settings in order to capture impacts of the CM change.

In one embodiment of step 5, operation describes how to generate the labels of the CM diagnostics solution: Our solution outputs the following labels as depicted below:

$$\text{Output Label} = \begin{cases} \text{Unlikely} \\ \text{Undecided} \\ \text{Likely} \end{cases}$$

where labels "Unlikely" and "Likely" refer to the respective cases in which KPI degradation is unlikely or likely to be caused by the CM misconfiguration, and label "Undecided" refer to the case in which an operation cannot decide if KPI degradation is related to the CM misconfiguration.

An operation uses the metrics described in equations 4-1 to 4-4 as inputs to generate the above labels via a mapping function. The label generation procedure is described as follows:

(1) computing the following average metrics:

$$R = \frac{(Rd_a + Rd_b)}{2} \text{ and } A = \frac{\max(Ad_a, Ad_b)}{N} \times 100$$

and (2) Map the quantity R into [0,1] using a certain mapping function, for example, the hyper-tangent function, defined by $$f(R) = \frac{1 - e^{-K*R}}{1 + e^{-K*R}}, \text{ where } K > 0.$$

The parameter K is selected based on labeled training data. The range of $f(R)$ is in [0,1] as illustrated in.

Figure 14:
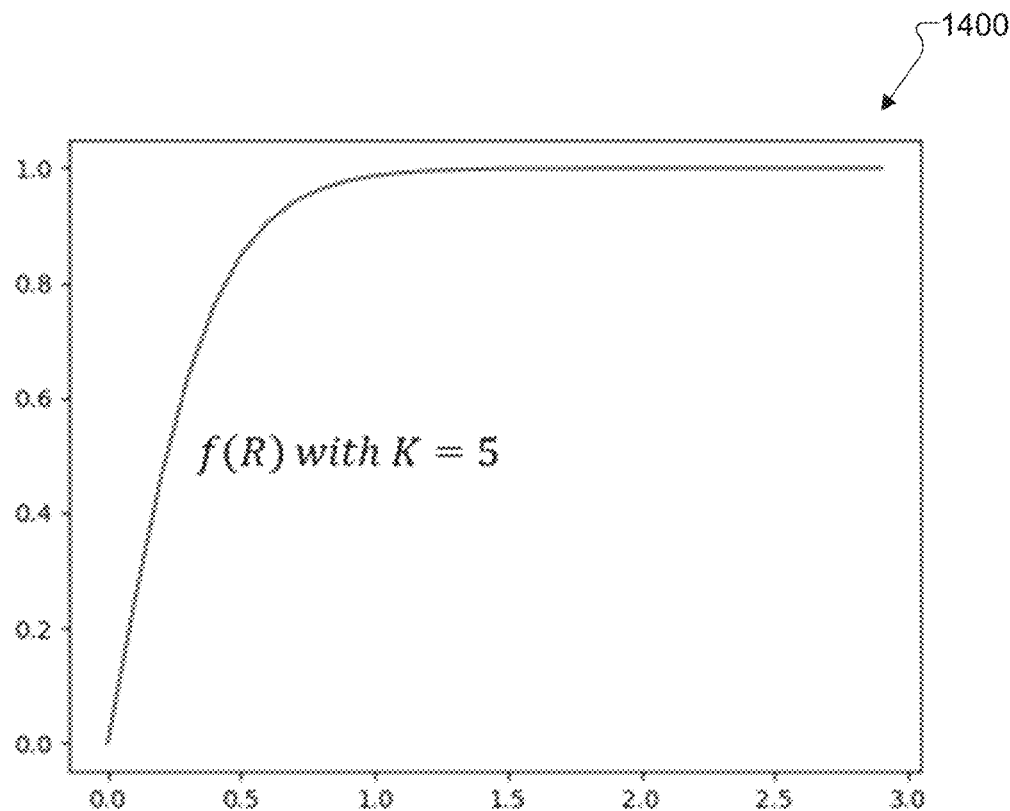
FIG. 14 illustrates an example of hyper-tangent function example (K=5) according to embodiments of the present disclosure.

FIG. 14 illustrates an example of the hyper-tangent function (K=5) 1400 according to embodiments of the present disclosure. An embodiment of the hyper-tangent function example (K=5) 1400 shown in FIG. 14 is for illustration only.

An operation next describes the procedure on how to output labels using the mapping function $f(R)$ and the quantity A for a CM change of a cell.

If A is less than a fixed threshold $A_{th}$, then output label is "Undecided" for this CM change of the cell. The choice of $A_{th}$ is obtained by using labeled training data.

If A is greater than or equal to the fixed threshold, then output labels based on the following rules for this CM change of the cell:

$$\text{Label} = \begin{cases} \text{Unlikely} & \text{if } f(R) \in [0, t_a) \\ \text{Undecided} & \text{if } f(R) \in [t_a, t_b) \\ \text{Likely} & \text{if } f(R) \in [t_{ab}, 1] \end{cases}$$

where the parameters $t_a$, and $t_b$ are selected based on labeled training data.

In TABLE 3 and TABLE 4, an operation depicts two examples of the output label and related quantities of the CM diagnostics solution, which are obtained using the field data containing CM changes.

Figure 27:
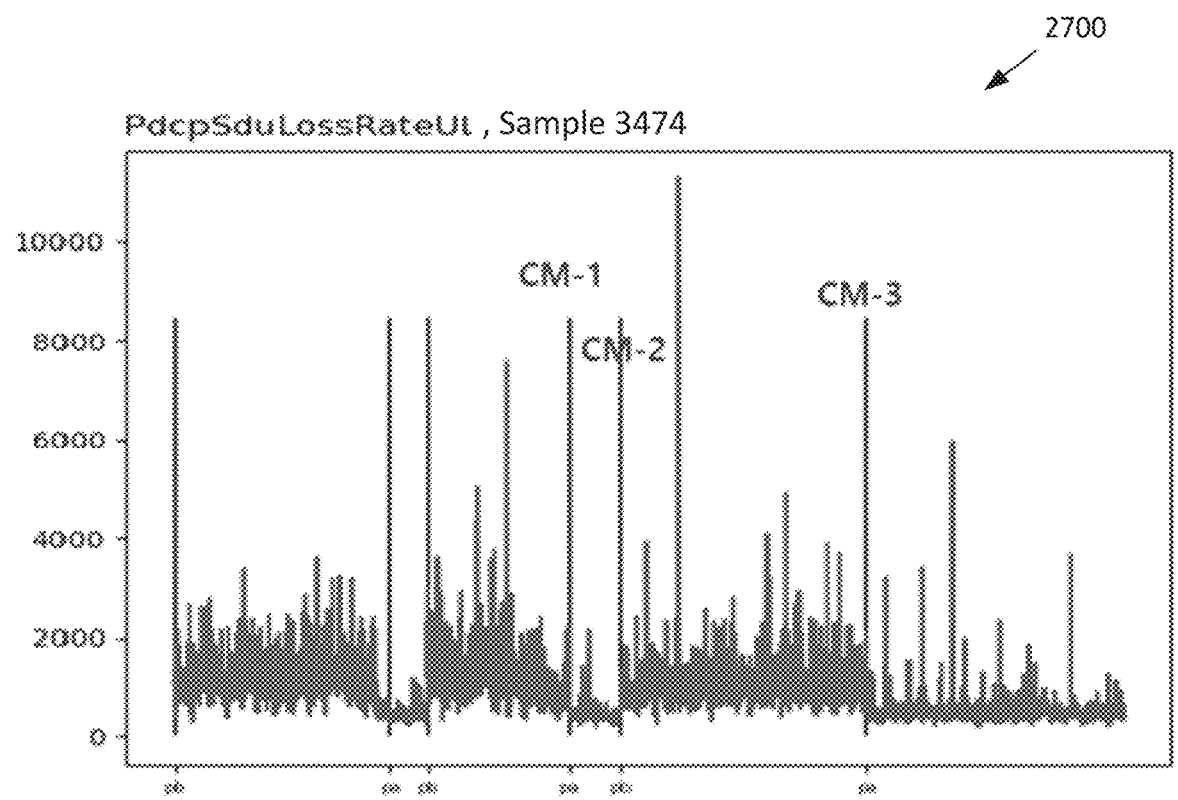
FIG. 27 illustrates an example of time series of UL packet loss rate under different CM settings according to embodiments of the present disclosure.

FIG. 27 illustrates an example of time series of UL packet loss rate under different CM settings 2700 according to embodiments of the present disclosure. An embodiment of the time series of UL packet loss rate under different CM settings 2700 shown in FIG. 27 is for illustration only.

Figure 28:
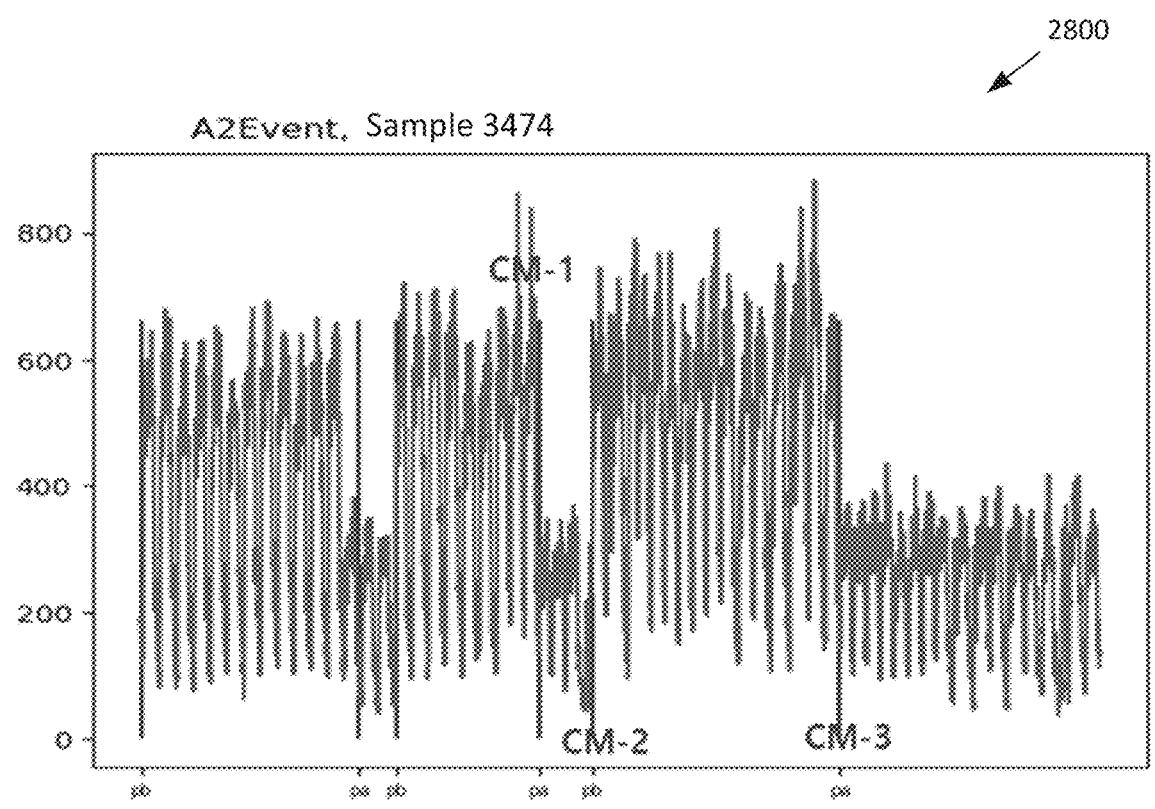
FIG. 28 illustrates an example of time series under different CM settings according to embodiments of the present disclosure.

FIG. 28 illustrates an example of time series under different CM settings 2800 according to embodiments of the present disclosure. An embodiment of the time series under different CM settings 2800 shown in FIG. 28 is for illustration only.

In particular, the experiment result 1 in TABLE 3 shows that large KPI variations cross three CM changes, namely CM-1, CM-2, and CM-3 are likely due to these CM changes. FIG. 27 depicts the time series of the target KPI under multiple CM changes including CM-1, CM-2, and CM-3, while FIG. 28 depicts the time series of the proxy variable A2 event under multiple CM changes including CM-1, CM-2, and CM-3. As can be seen these two figures, target KPI degrades significantly and meanwhile the proxy variable A2 event also increases dramatically after CM-2. This indicates partially that the change of HO parameter A2 take effects and is likely to the dramatic increase of A2 event.

TABLE 3

Experiment result 1 of the CM diagnostics solution

| Time-stamp | CM | $Rd_a$ | $Rd_b$ | R | f(R) (prob.) | Label |
|---|---|---|---|---|---|---|
| 2020-05-28 | CM-1 | 2.891892 | 0.064706 | 1.478299 | 90% | Likely |
| 2020-06-14 | CM-2 | 0.091954 | 2.634146 | 1.36305 | 88% | Likely |
| 2020-07-19 | CM-3 | 1.583333 | 0.045455 | 0.814394 | 67% | Likely |

Figure 29:
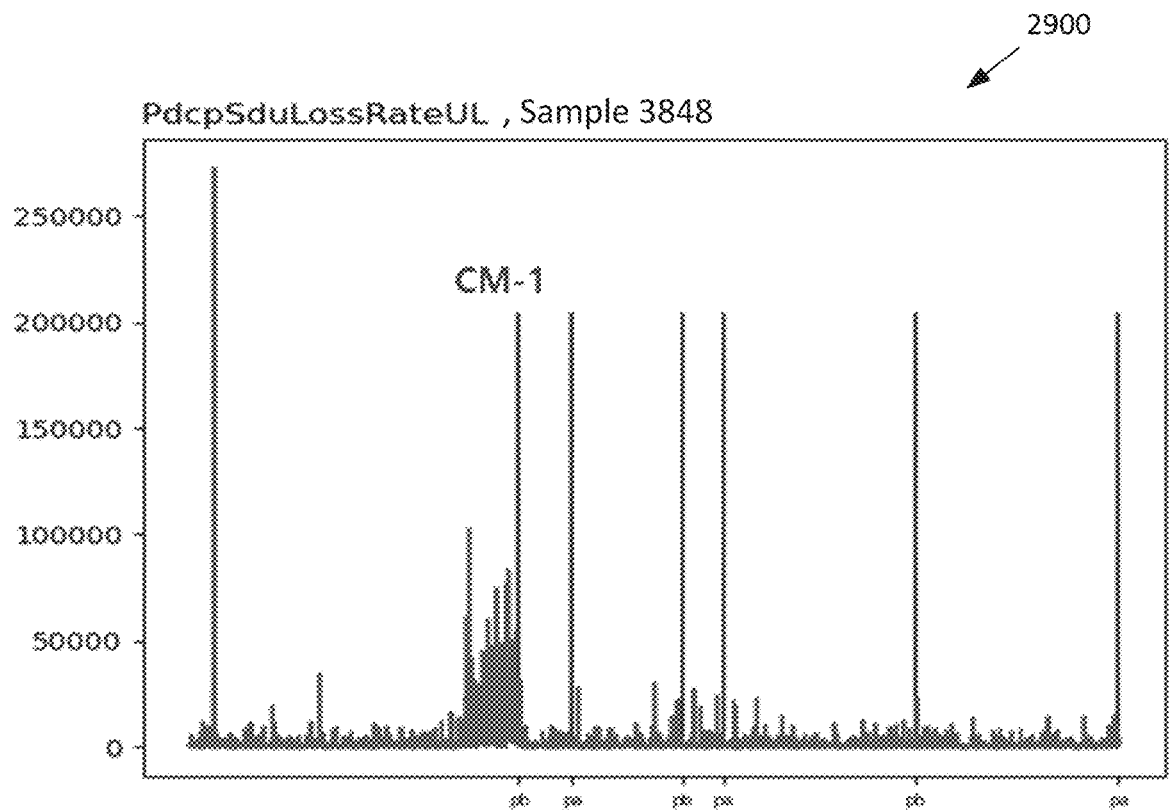
FIG. 29 illustrates an example of time series of UL packet loss rate under different CM settings according to embodiments of the present disclosure.

FIG. 29 illustrates an example of time series of UL packet loss rate under different CM settings 2900 according to embodiments of the present disclosure. An embodiment of the time series of UL packet loss rate under different CM settings 2900 shown in FIG. 29 is for illustration only.

Figure 30:
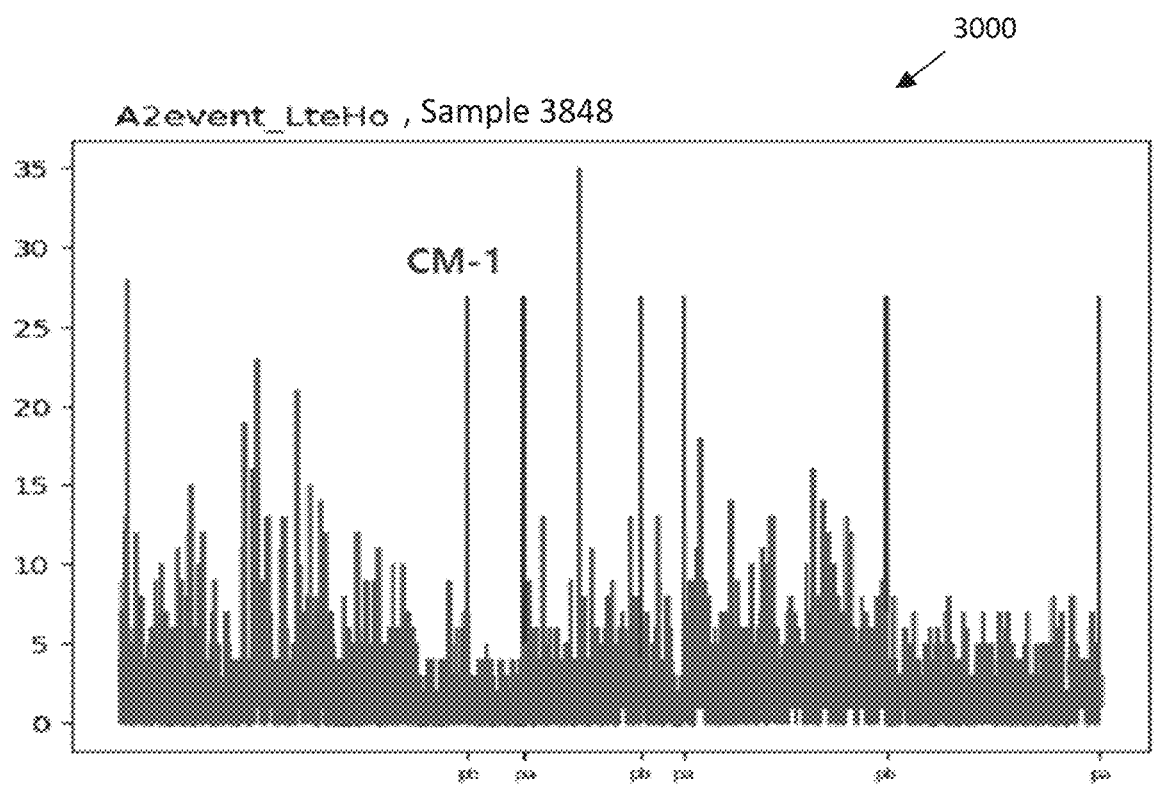
FIG. 30 illustrates an example of time series under different CM settings according to embodiments of the present disclosure.

FIG. 30 illustrates an example of time series under different CM settings 3000 according to embodiments of the present disclosure. An embodiment of the time series under different CM settings 3000 shown in FIG. 30 is for illustration only.

The experiment result 2 in TABLE 4 shows that large KPI variations cross a CM change, namely CM-1 is unlikely due to this change. FIG. 29 depicts the time series of the target KPI under multiple CM changes including CM-1, while FIG. 28 depicts the time series of the proxy variable A2 event under multiple CM changes including CM-1. As can be seen from these two figures, the target KPI is much worse in the before CM-1 interval than that during the after CM interval. However, the variations in the proxy variable A2 events between intervals of before and after CM-1 change do not seem that much significant. This indicates partially that the change of HO parameter A2 does not take dramatic effects and the significant KPI changes between intervals of before and after CM-1 change is unlikely due to CM-1 change.

TABLE 4

Experiment result 2 of the CM diagnostics solution

| Time-stamp | CM | $Rd_a$ | $Rd_b$ | R | f(R) (prob.) | Label |
|---|---|---|---|---|---|---|
| 2020-05-10 | CM-1 | 0.227273 | 0.02381 | 0.125541 | 12% | Unlikely |

As mentioned in the present disclosure, Step 3, an operation provides the following functional relationship: y=f(X, p) where y, X, and p denote a target KPI to be optimized (e.g., DL throughput), feature KPIs, and the parameters, respectively.

At a given cell, suppose that there exist finitely many parameter settings $p_1, p_2, \ldots, p_L$. Moreover, under each parameter setting $p_i$, a group of samples $S_i = \{(X_i, y_i)\}$ is available with cardinality $|S_i| = N_i$, where i denotes an index (i=1, ..., L), $X_i$ denotes the i-th set of feature KPIs (regressors), and $p_i$ denotes the i-th parameter vector. The objective of the cell-level CM recommender APP is to infer the best static parameter setting among $p_1, p_2, \ldots, p_L$ using the available cell-level data. Here, static refers to the long-term and hence the objective is to determine the parameter setting that optimizes the average target KPI in the long-term (e.g., in minimizing UL packet loss rate).

In cellular networks, it is difficult to capture the parameter impact on the network performance. This is because network KPIs are affected by many factors including random and daily/seasonal variations as well as hidden (unobservable) factors. In addition, for new trial parameters, usually only a small sample is available for inference. Conventional methods (e.g., short-term average) are based on the average target KPI values, which can only represent a cumulative effect of all factors. Moreover, for trial parameters, average target KPI over a small sample is more sensitive to random/daily variations and hidden factors. Hence, conventional methods are not capable of accurately capturing the parameter impact especially for small samples. In other words, conventional methods need a large sample for a reliable inference or, equivalently, a longer evaluation period, which sacrifices operational efficiency.

In the following embodiment, an operation provides a new technique that well captures the parameter impact and well handles small-size samples with the goal of improving the operational efficiency (i.e., shorter evaluation period for a reliable decision).

Since the objective is to determine the best static parameter, the ground truth solution is based on the long-term average target KPI. Suppose that in the long-term, there exist $N_{b,long}$ and $N_{a,long}$ samples under parameters $p_b$ and $p_a$, respectively, where $N_{b,long}$ and $N_{a,long}$ are sufficiently large (e.g., larger than 900, which corresponds to 15 weekdays of data). Let the long-term average target KPIs be computed as:

$$\bar{y}_b = \frac{1}{N_{b,long}} \sum_{i=1}^{N_{b,long}} y_i, \text{ and } \bar{y}_a = \frac{1}{N_{a,long}} \sum_{j=1}^{N_{a,long}} y_j,$$

for $p_b$ and $p_a$, respectively. Moreover, let the ratio of the difference be defined as follows:

$$r_{a,b} = \frac{\bar{y}_a - \bar{y}_b}{\bar{y}_b}.$$

Assuming a smaller target KPI is better (e.g., UL packet loss rate) and choosing a small decision threshold $\Delta>0$ (e.g., $\Delta=0.01$), the ground truth solution is given as follows: (1) if $r_{a,b} \geq \Delta$, then $p_b$ is better than $p_a \rightarrow$recommend $p_b$, (2) if $r_{a,b} \leq -\Delta$, then $p_a$ is better than $p_b \rightarrow$recommend $p_a$, and (3) if $-\Delta < r_{a,b} < \Delta$, then there is no significant difference between $p_a$ and $p_b$ (either parameter is fine).

As briefly explained in the use cases of the present disclosure, conventional methods typically compare the average target KPI values over available data under different parameter settings. Given $S_i = \{(x_i, y_i)\}$ under parameter $p_i$, the average target KPI is computed by:

$$\bar{y}_i = \frac{1}{N_i} \sum_{i=1}^{N_i} y_i$$

Where $N_i$ denotes the number of available samples, typically small (e.g., 60, 120, 180 corresponding to a few days of data).

Assuming a smaller target KPI is better (e.g., UL packet loss rate), the conventional solution between any two parameters $p_b$ and $p_a$ is given as follows (see FIG. 15): (1) if $\bar{y}_a \geq \bar{y}_b$, then $p_b$ is better than $p_a \rightarrow$recommend $p_b$ and (2) if $\bar{y}_a < \bar{y}_b$, then $p_a$ is better than $p_b \rightarrow$recommend $p_a$.

Figure 15:
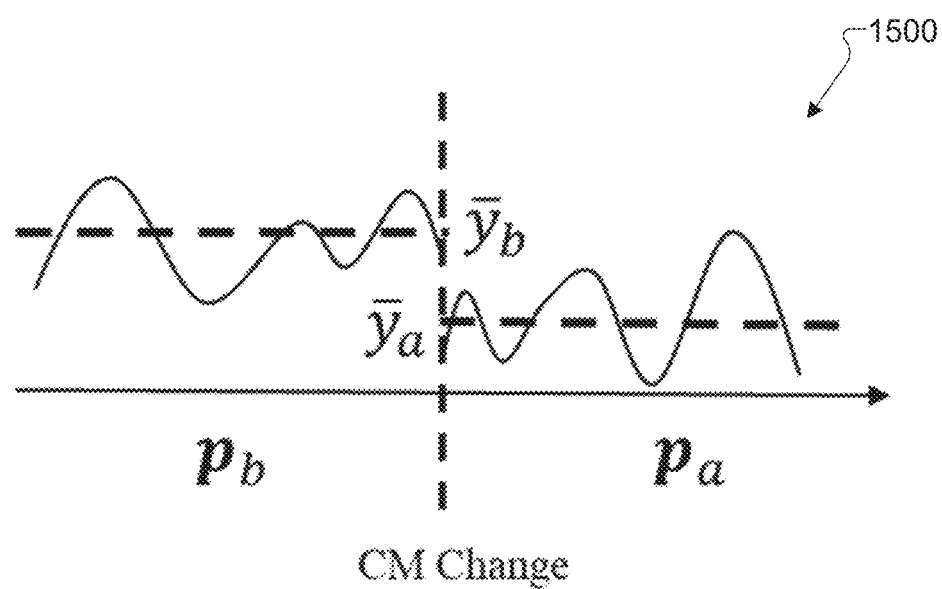
FIG. 15 illustrates an example of target KPI and time under parameter settings p_b and p_a according to embodiments of the present disclosure.

FIG. 15 illustrates an example of target KPI and time under parameter settings p_b and p_a 1500 according to embodiments of the present disclosure. An embodiment of the target KPI and time under parameter settings p_b and p_a 1500 shown in FIG. 15 is for illustration only.

If an operation could learn the function $y=f(X,p)$, then an operation may be able to capture the parameter impact. To learn this function from a historical dataset via a ML technique such as regression, an operation needs to have a sufficient sample diversity from y, X, and p. However, at the cell-level, parameter diversity is quite limited because CM changes happen infrequently. In fact, it is common to have only a few existing parameter settings in a given historical dataset of a cell. Hence, an operation needs an alternate of p such that the alternate well captures the impact of p as well as has a good sample diversity. Moreover, the alternate may be ideally independent from x. In addition, the target KPI y may not be a cause of the alternate (i.e., there may be no reverse causal relationship).

At a given cell, suppose that there exist L distinct parameter settings $p_1, p_2, \ldots, p_L$. An operation first trains a random forest regression model $y=f(X,h)$ using historical samples from all parameter settings. Note that if there is a sample imbalance between different parameter settings, an operation employs basic oversampling for the minority parameters to match the number of samples from all parameter settings in the training phase.

The regression model has a parameter-related term h and a parameter-unrelated term X. This enables an operation to keep the parameter-unrelated term fixed and only vary the parameter-related term to better identify the parameter impact. Hence, in the evaluation phase of the provided algorithm, an operation predicts the target KPI through the regression model by varying h while keeping X fixed. Accordingly, an operation recommends the optimum parameter setting based on the predicted target KPIs, as detailed below.

Figure 16:
FIG. 16 illustrates an example of summary of the regression-based CM recommender algorithm through an example with three parameters p_1, p_2, and p_3 according to embodiments of the present disclosure.

FIG. 16 illustrates an example of summary of the regression-based CM recommender algorithm through an example with three parameters p_1, p_2, and p_3 1600 according to embodiments of the present disclosure. An embodiment of the summary of the regression-based CM recommender algorithm through an example with three parameters p_1, p_2, and p_3 1600 shown in FIG. 16 is for illustration only.

FIG. 16 summarizes the provided algorithm via an example case where the goal is to determine the best static parameter among $p_1$, $p_2$, and $p_3$. Suppose that there exist $N_1$, $N_2$, $N_3$ samples under $p_1$, $p_2$, $p_3$, respectively. In the algorithm procedure, for evaluation, an operation needs to get the same number of samples from each parameter setting (for cross pairs). Let $N_2 = \min(N_1, N_2, N_3)$. Then, an operation picks $N_2$ samples from each parameter in the form of $\{(y_{11},(X_1,h_1))\}$, $\{(y_{22},(X_2,h_2))\}$, and $\{(y_{33},(X_3,h_3))\}$ for $p_1$, $p_2$, and $p_3$, respectively. Notice that $(X_1,h_1)$, $(X_2,h_2)$, and $(X_3,h_3)$ pairs and their corresponding ground-truth target KPIs $y_{11}$, $y_{22}$, and $y_{33}$ already exist. In addition to the existing pairs, an operation also puts together all possible cross pairs: $(X_1,h_2)$, $(X_1,h_3)$, $(X_2,h_1)$, $(X_2,h_3)$, $(X_3,h_1)$, and $(X_3,h_2)$, however, their corresponding ground-truth target KPIs do not exist.

Next, to capture the parameter impact, an operation varies the parameter-related term (h) while keeping the parameter-unrelated term (X) fixed. There are three different parameter-unrelated terms $X_1$, $X_2$, and $X_3$. An operation pairs them with each parameter-related term one by one. For example, for $h_1$, an operation has the pairs $(X_1,h_1)$, $(X_2,h_1)$, and $(X_3,h_1)$. Then, an operation computes the corresponding predicted target KPIs via the pre-trained regression model as given by $\hat{y}_{11}=f(X_1,h_1)$, $\hat{y}_{21}=f(X_2, h)$, and $\hat{y}_{31}=f(X_3,h_1)$. An operation performs these computations for all the available $N_2$ samples from each pair and obtains the corresponding set of predicted target KPIs, that is, $\{\hat{y}_{11}\}$, $\{\hat{y}_{21}\}$, and $\{\hat{y}_{31}\}$.

Next, an operation computes the median values and takes their average as given by:

$\bar{y}_i = (\text{med}(\{y_{11}\})) + (\text{med}(\{\hat{y}_{21}\})) + (\text{med}(\{\hat{y}_{31}\}))/3$, which represents the average predicted target KPI under the parameter setting $p_1$. Similarly, an operation computes:

$\bar{y}_2 = (\text{med}(\{\hat{y}_{12}\})) + (\text{med}(\{\hat{y}_{22}\})) + (\text{med}(\{\hat{y}_{32}\}))/3$ and $\bar{y}3 = (\text{med}(\{\hat{y}_{13}\})) + (\text{med}(\{\hat{y}_{23}\})) + (\text{med}(\{\hat{y}_{33}\}))/3$ for $p_2$ and $p_3$, respectively. Finally, an operation recommends the parameter setting $p_{i*}$ that has the smallest predicted average target KPI (i.e., lowest predicted UL packet loss rate), that is, $i^* = \text{argmin}_{i=1,2,3} \bar{y}_i$.

The provided algorithm is based on prediction of the target KPI via a regression model. Since the regression model is trained with all the historical cell-level data, an operation argues that the regression model can well predict the long-term cell behavior, which is potentially useful to recommend the best static parameter setting.

As the provided solution is regression-based, accuracy of the regression model is critical to the success of the solution. For the existing pairs $(X_i, h_i)$, corresponding ground-truth target KPI values $y_{ii}$ also exist in a given dataset and the regression model is trained based on the existing pairs. After training, an operation can evaluate the prediction accuracy for the existing pairs as well by simply comparing predicted targets with the ground-truth targets. For example, an operation can use the R2 score as the performance metric for the existing pairs. However, for the cross pairs, since the corresponding ground truth targets do not exist in a given dataset, an operation devises a new procedure to evaluate the prediction accuracy for the cross pairs, as detailed below.

Figure 17:
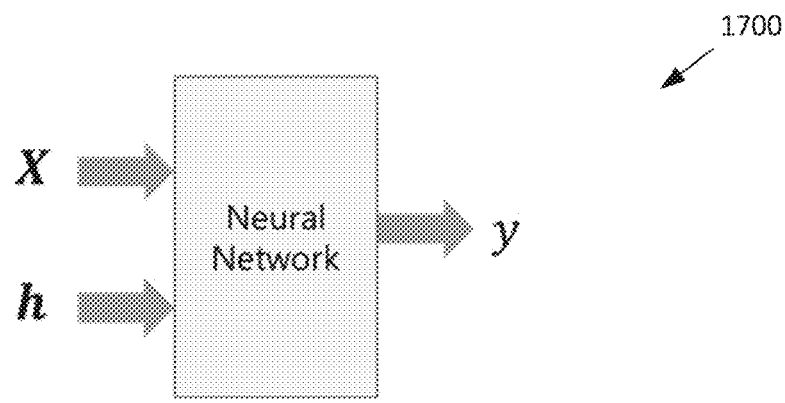
FIG. 17 illustrates an example of a neural network trained for providing ground truth target KPI values according to embodiments of the present disclosure.
Figure 17:
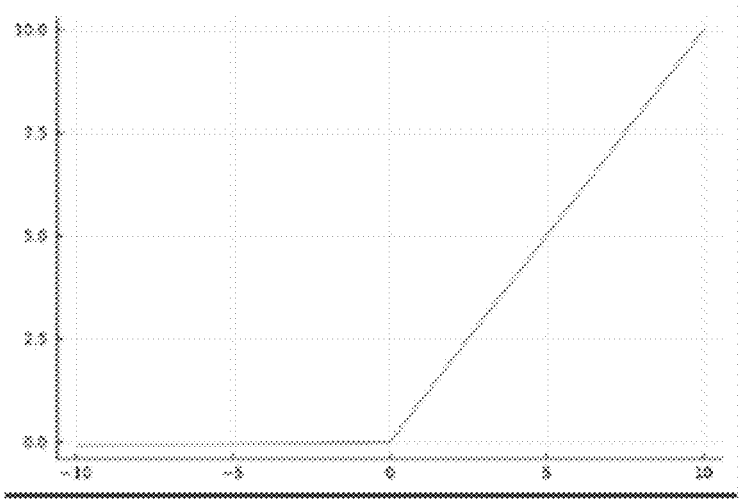
Figure 17:
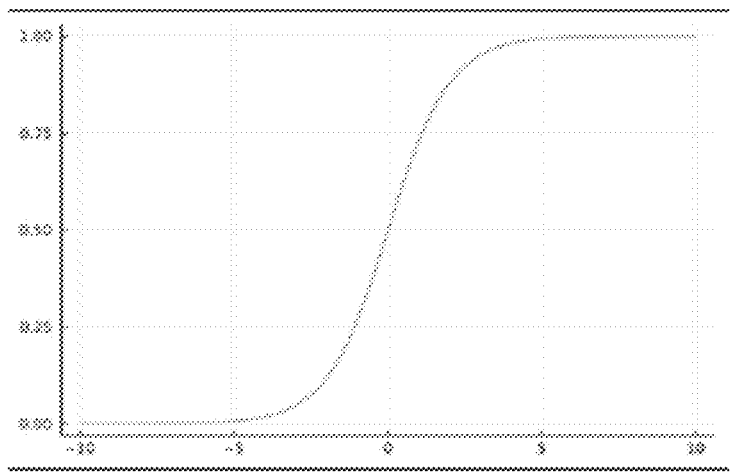

FIG. 17 illustrates an example of a neural network trained for providing ground truth target KPI values 1700 according to embodiments of the present disclosure. An embodiment of the neural network trained for providing ground truth target KPI values 1700 shown in FIG. 17 is for illustration only.

To define an artificial relationship between the regressor KPLs and the target KPI, which can capture some physics of field data, an operation trains a neural network across all cells. In the neural network, an operation uses 10 dense (i.e., fully connected) hidden layers with leaky rectified linear unit (ReLU) activations and an output layer with a sigmoidal activation to emulate the target KPI (i.e., VoLTE UL packet loss rate). After training is done, an operation assumes that the neural network provides the ground truth target KPI values for both existing pairs and cross pairs. Based on this assumption, an operation performs the following experiments.

In one example of Experiment 1, predict y for existing terms $[X_b, h_b]$ and $[X_a, h_a]$ (ground truth target exists).

Figure 18:
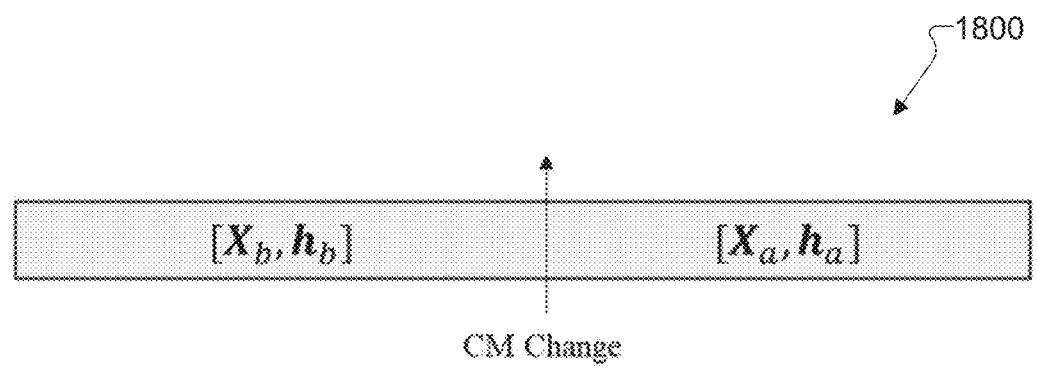
FIG. 18 illustrates an example of predict y for existing terms [X_b, h_b] and [X_a, h_a](ground truth target exists) according to embodiments of the present disclosure.

FIG. 18 illustrates an example of predict y for existing terms [X_b, h_b] and [X_a, h_a](ground truth target exists) 1800 according to embodiments of the present disclosure. An embodiment of the predict y for existing terms [X_b, h_b] and [X_a, h_a](ground truth target exists) 1800 shown in FIG. 18 is for illustration only.

In one example of Experiment 2, predict y for cross terms $[x_b, h_a]$ and $[x_a, h_b]$ (ground truth target does not exist).

Figure 19:
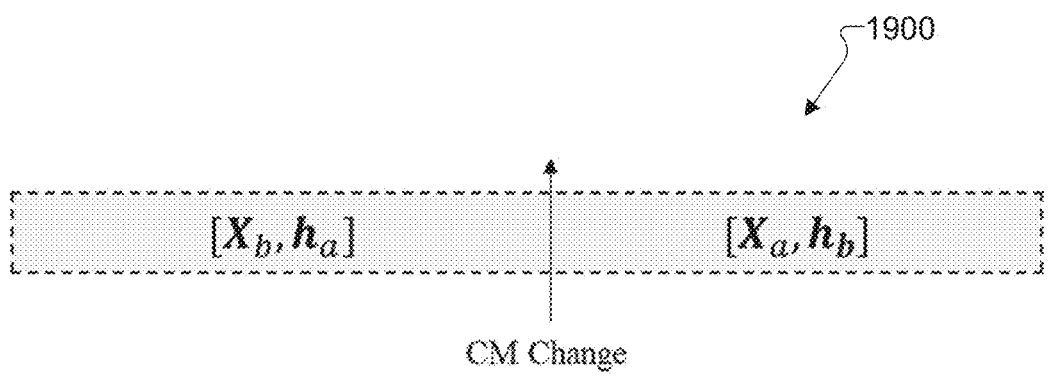
FIG. 19 illustrates an example of predicted y for cross terms [X_b, h_a] and [X_a, h_b](ground truth target does not exist) according to embodiments of the present disclosure.

FIG. 19 illustrates an example of predicted y for cross terms [X_b, h_a] and [X_a, h_b](ground truth target does not exist) 1900 according to embodiments of the present disclosure. An embodiment of the predicted y for cross terms [X_b, h_a] and [X_a, h_b](ground truth target does not exist) 1900 shown in FIG. 19 is for illustration only.

Given a field dataset, natural partitioning of the data corresponds to CM changes. By considering $[x_b, h_b]$ as existing pairs before a CM change and $[x_a, h_a]$ as existing pairs after a CM change, an operation was able to perform 872 experiments from 164 cells (see FIG. 17). In all experiments, an operation used the same amount of data from before and after the CM change. After training a regression model using only existing pairs, an operation mainly performed two kinds of experiments. In the experiment 1 (see FIG. 17), per CM change, an operation computes the test R2 score on the existing pairs data $[x_b, h_b]$ and $[x_a, h_a]$. In the experiment 2 (see FIG. 18), per CM change, an operation computes the test R2 score on the cross pairs data $[x_b, h_a]$ and $[x_a, h_b]$. TABLE 5 provides the mean and median test R2 scores over 872 experiments for the experiment 1 and experiment 2. an operation observes that although cross pairs data were not seen by the regression models, prediction accuracy is still good for the cross pairs. Hence, this experiment justifies the use of the cross pairs in the provided solution.

TABLE 5

Mean and median

| Experiment | Mean R2 score | Median R2 score |
|---|---|---|
| Experiment 1 | 0.481 | 0.493 |
| Experiment 2 | 0.674 | 0.705 |

In the experiments, an operation collects the field data with tuning handover A1, A2, and A5 event parameters (see TABLE 6 for a summary of the tuning parameters). The goal of parameter tuning is to avoid unnecessary Measurement GAP (M-GAP) to improve the VoLTE uplink performance such as VoLTE UL packet loss rate. In particular, an operation provides two parameter combo case with a default parameter combo (vector) $p_D$ and a trial parameter combo (vector) $p_T$ per cell. Since the purpose of parameter tuning in the field experiments is to avoid M-GAP, an operation considers that the default parameter corresponds to a case where there is M-GAP while the trial parameter corresponds to a case where there is no M-GAP.

TABLE 6

A summary of the tuning handover parameters in the field data

| Events | Triggering Condition | Parameter | Purpose |
|---|---|---|---|
| A1 Event | Serving cell RSRP becomes better than a threshold | A1 Thd | Stopping GAP measurement |
| A2 Event | Serving cell RSRP becomes worse than a threshold | A2 Thd | Triggering GAP measurement |
| A5-1 Event | Serving cell RSRP becomes worse than a threshold | A5-1 Thd | Triggering Handover procedure |

A valid CM change is defined for consecutive CM intervals (either $p_D \rightarrow p_T$ or $p_T \rightarrow p_D$) if there exist at least 180 samples (i.e., 3 days of data) from both $p_D$ and $p_T$ (see FIG. 19 for an illustration). Note that it is possible to have multiple valid CM changes per cell. Parameter recommender solutions are evaluated per each valid CM change.

The provided regression-based solution is employed for each valid CM change to recommend either $p_D$ or $p_T$. In the training of each regression model, only historical cell-level data is used, where there exists a large sample from $p_D$ and a small sample from $p_T$. Against the sample imbalance, small sample from $p_T$ is oversampled such that the number of samples from $p_D$ and $p_T$ is the same in the training phase.

In the evaluation phase, let the number of samples used from $p_D$ and $p_T$ be denoted by $N_1$ and $N_2$, respectively. The number of samples available from $p_T$ is usually small (e.g., $N_2=60$ for 1 day, $N_2=120$ for 2 days, and $N_2=180$ for 3 days). An operation gets the same number of samples from $p_D$ for evaluation (i.e., $N_1=N_2$).

In the parameter recommendation problem, the objective is to determine the best static parameter setting. Hence, evaluation of any solution is based on the long-term performance corresponding to the recommended parameter.

In our experiments, an operation defines the KPI gain against the default parameter. Let $\bar{y}_D$ and $\bar{y}_T$ denote the long-term average target KPI (UL packet loss rate) corresponding to the default parameter and the trial parameter, respectively. The ground-truth solution achieves $\min(\bar{y}_D, \bar{y}_T)$ in the long-term. Hence, the maximum possible gain against the default parameter is $$\text{Max Gain (ground - truth solution)} = 100 \times \frac{\bar{y}_D - \min(\bar{y}_D, \bar{y}_T)}{\bar{y}_D}.$$

Let the long-term average UL packet loss rate corresponding to the parameter setting recommended by the regression-based solution be denoted by $\bar{y}_R$. Then, the gain of the regression based solution against the default parameter is given by gain $$\text{(regression - based solution)} = 100 \times \frac{\bar{y}_D - \bar{y}_R}{\bar{y}_D} \%.$$

Furthermore, let the long-term average UL packet loss rate corresponding to the parameter setting recommended by the conventional solution be denoted by $\bar{y}_c$. Then, the gain of the conventional solution against the default parameter is given by:

$$\text{Gain (conventional solution)} = 100 \times \frac{\bar{y}_D - \bar{y}_C}{\bar{y}_D} \%.$$

Figure 20:
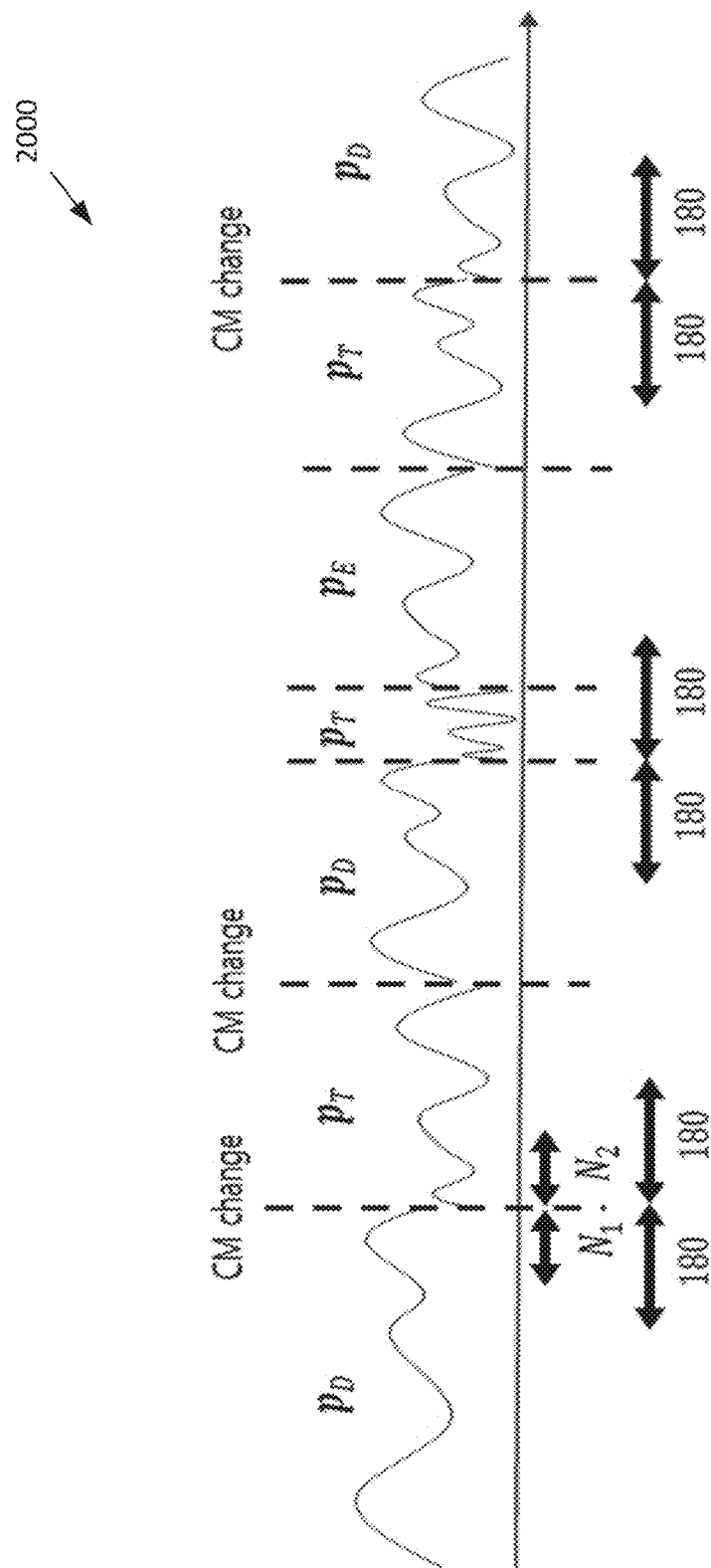
FIG. 20 illustrates an example of valid CM changes between p_D and p_T at a cell according to embodiments of the present disclosure.

FIG. 20 illustrates an example of valid CM changes between p_D and p_T at a cell 2000 according to embodiments of the present disclosure. An embodiment of the valid CM changes between p_D and p_T at a cell 2000 shown in FIG. 20 is for illustration only.

FIG. 20 illustrates the mean KPI gain versus the default parameter setting as the number of samples from the trial parameter varies. The mean KPI gain is computed over 1651 valid CM changes in all the PSMAs. For example, in the case where $N_1=N_2=120$, there is 5.72% performance gap between the ground-truth solution and the conventional solution. In this case, the regression-based solution (Solution A) achieves 4.81% more KPI gain than the conventional solution. Hence, the regression-based solution closes the performance gap by 84.1%.

Figure 21:
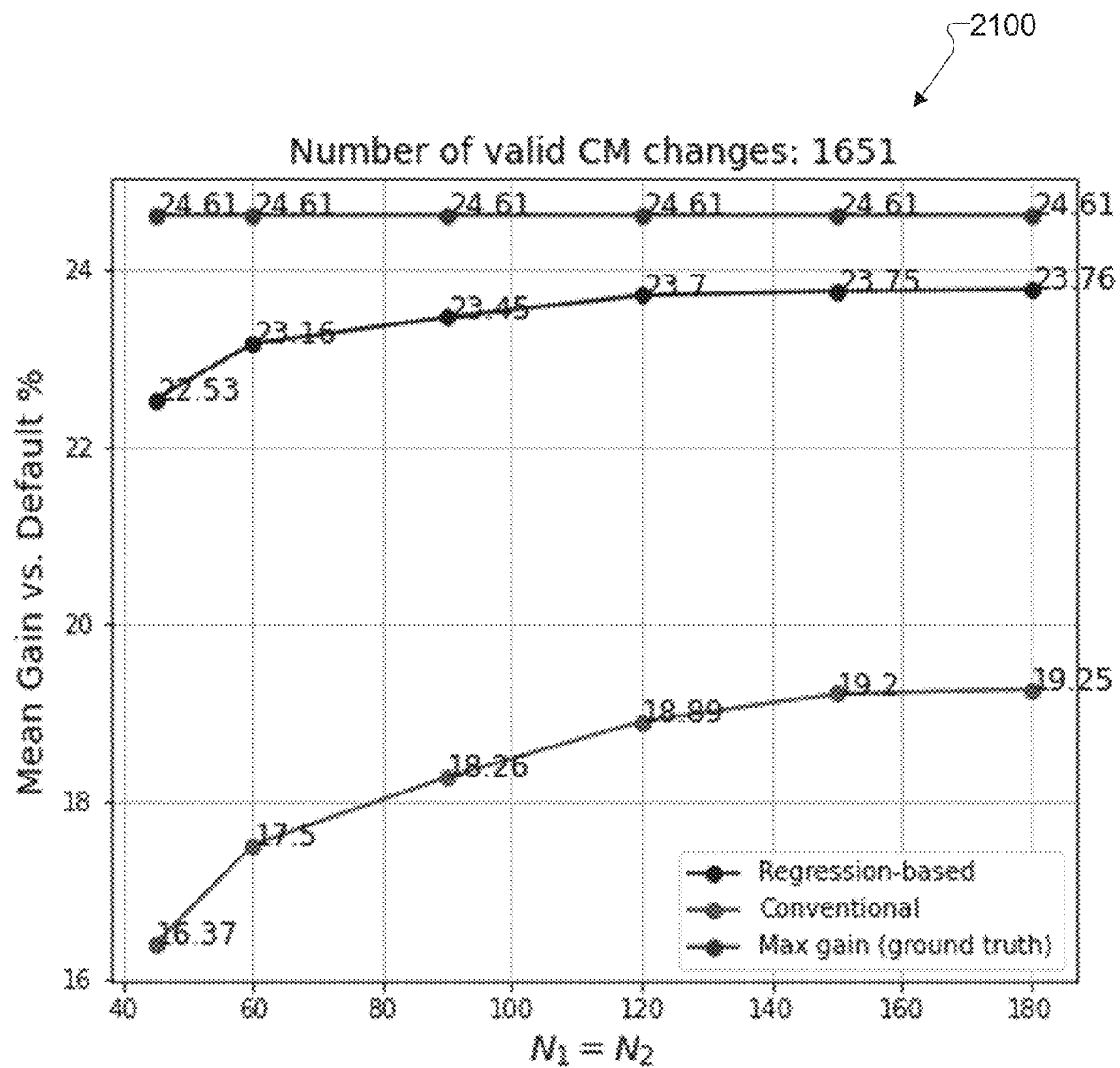
FIG. 21 illustrates an example of mean KPI gain at all PSMAs (PSMAs 0-3) as the number of available samples from the trial parameter varies (for the regression-based solution) according to embodiments of the present disclosure.

FIG. 21 illustrates an example of mean KPI gain at all PSMAs (PSMAs 0-3) as the number of available samples from the trial parameter varies (for the regression-based solution) 2100 according to embodiments of the present disclosure. An embodiment of the mean KPI gain at all PSMAs (PSMAs 0-3) as the number of available samples from the trial parameter varies (for the regression-based solution) 2100 shown in FIG. 21 is for illustration only.

Furthermore, FIG. 21 illustrates a comparison between the ground-truth solution and the regression-based solution through a histogram of the KPI gain versus the default parameter setting for 1651 valid CM changes.

Finally, TABLE 7 provides the probability values that the KPI gain falls into certain intervals for the regression-based solution and the ground-truth solution.

TABLE 7

The probabilities that the KPI gain falls into certain intervals at all PSMAs where $N_1 = N_2 = 120$ (for the regression-based solution).

| KPI Gain | Regression-based (probability) | Ground Truth (probability) |
|---|---|---|
| <0% | 0% | 0% |
| 0% | 4.8% | 0% |
| (0%, 20%] | 44.8% | 47.6% |
| (20%, 40%] | 34.3% | 36.1% |
| (40%, 60%] | 12.3% | 12.5% |
| >60% | 3.8% | 3.8% |

In one embodiment, the outputs of CM analytics functions are provided to SON controller for further actions such as a correction of parameter misconfiguration based on CM diagnostics solution, and configure CM settings based on the CM recommender output.

In one embodiment, FIG. 16 describes a method to select the best parameter setting from multiple parameter setting existing in a cell's historical data. Suppose that an operation has L distinct parameter combos existing in a cell's historical data. In the method, an operation needs to predict L diagonal-terms and L(L−1) cross terms. In particular, the number of cross-term exhibits quadratic growth with L.

Figure 22:
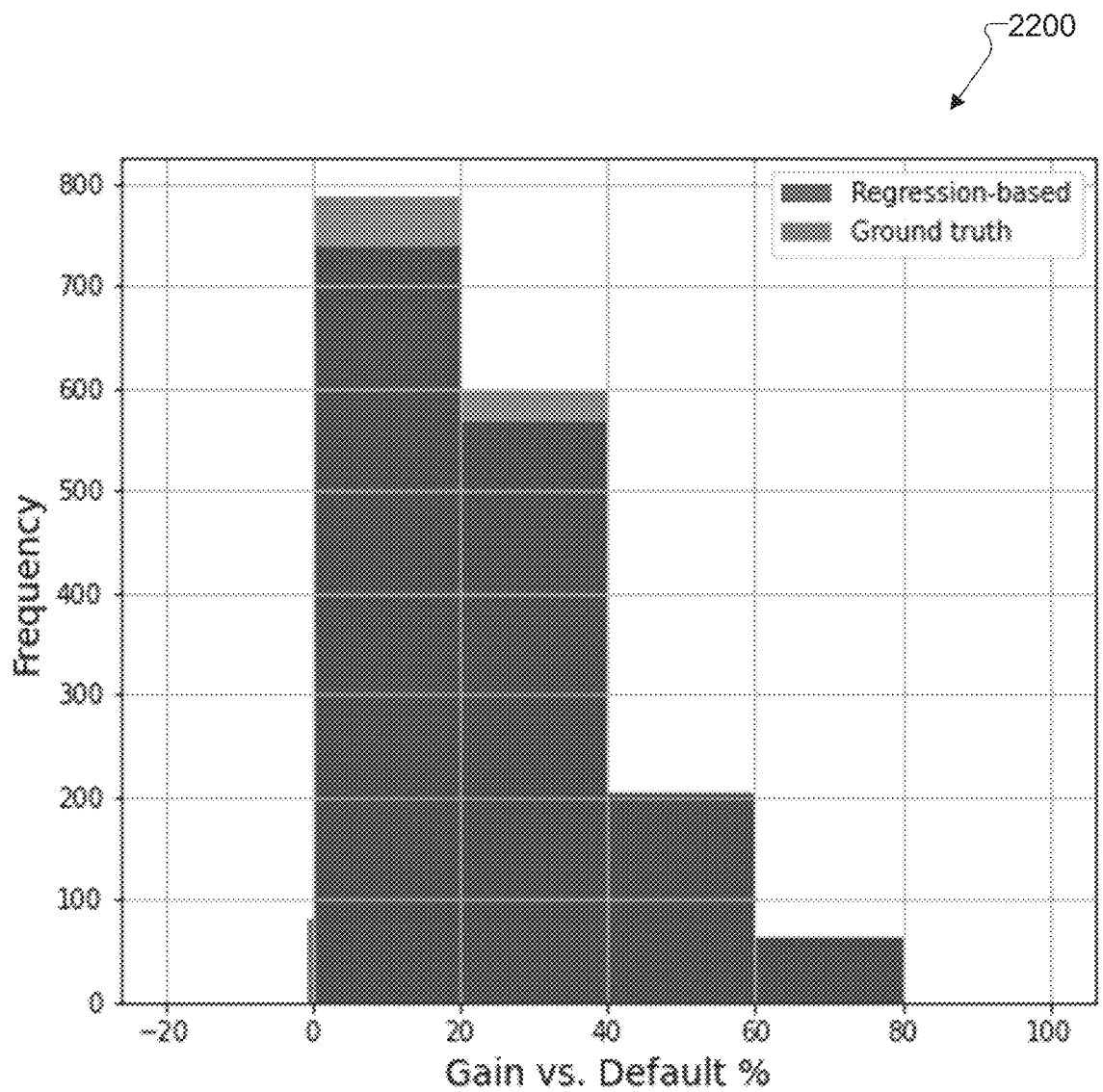
FIG. 22 illustrates an example of histogram of the KPI gain at all PSMAs where N_1=N_2=120 (for the regression-based solution) according to embodiments of the present disclosure.

FIG. 22 illustrates an example of histogram of the KPI gain at all PSMAs where $N\_1=N\_2=120$ (for the regression-based solution) 2200 according to embodiments of the present disclosure. An embodiment of the histogram of the KPI gain at all PSMAs where $N\_1=N\_2=120$ (for the regression-based solution) 2200 shown in FIG. 22 is for illustration only.

In one embodiment, an operation provides an alternative method to select the best parameter combo from multiple parameter combo existing in a cell's historical data for L>2, which an operation names. In the method, instead of predicting L(L−1) cross terms, an operation performs pairwise comparisons with default parameter combos. An operation provides detailed descriptions for the methods as follows.

Figure 23:
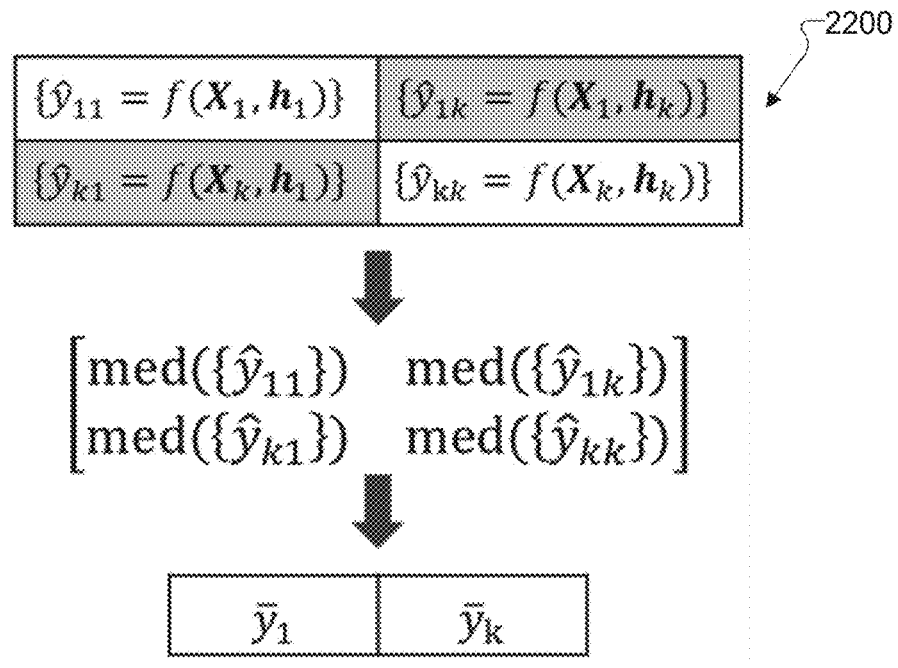
FIG. 23 illustrates an example of parameter selection according to embodiments of the present disclosure.

In one embodiment of Step 1, for each trial parameter $p_k$, an operation computes relative gain $G_{k1}$ against the default parameter $p_1$, where the relative gain $G_{k1}$ is defined as follows:

$$G_{k1} = \frac{\bar{y}_1 - \bar{y}_k}{\bar{y}_1}$$

where $\bar{y}_1$ and $\bar{y}_k$ are defined as follows (same as ones defined in FIG. 23).

In one embodiment of Step 2, a final parameter recommendation is based on relative gain statistics: (1) recommend $p_1$ if $G_{k1}<0$, $\forall k \in \{2,3, \ldots, L\}$ and (2) Otherwise, recommend $p_{k*}$ where $k^*=\text{argmax}_k G_{k1}$, k=2, 3, ..., L FIG. 23 illustrates an example of parameter selection 2300 according to embodiments of the present disclosure. An embodiment of the parameter selection 2300 shown in FIG. 23 is for illustration only.

Figure 24:
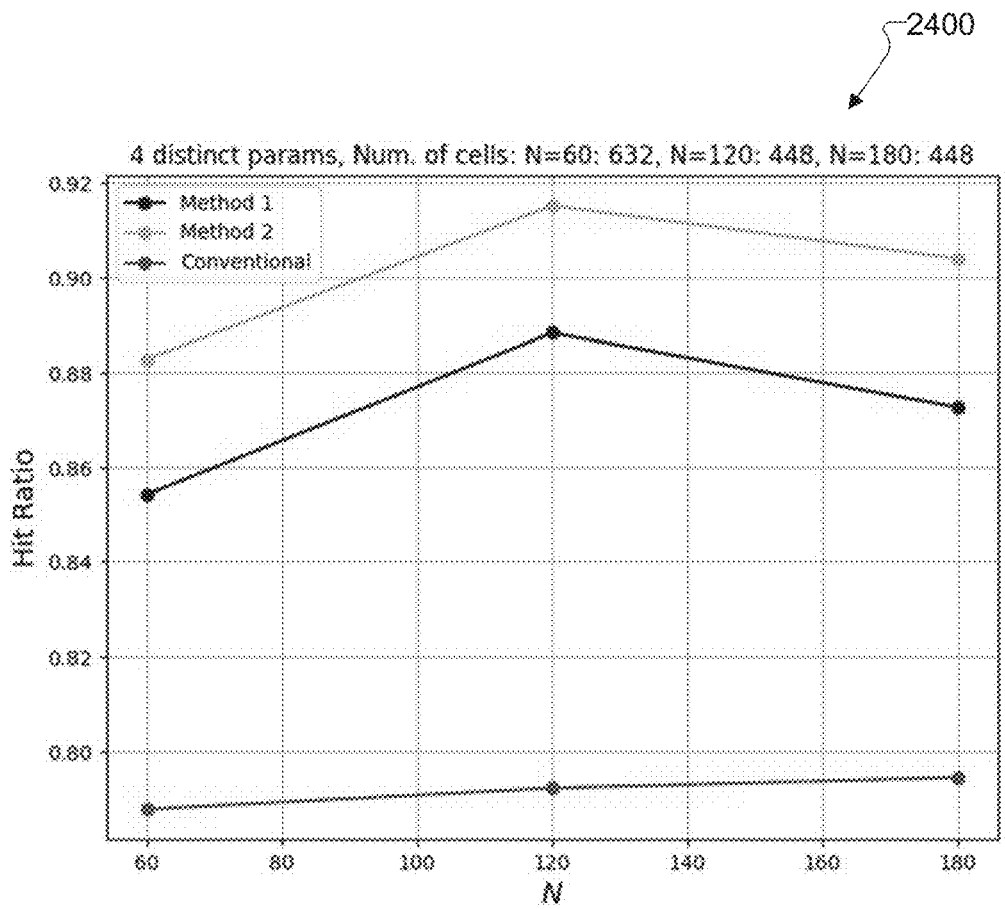
FIG. 24 illustrates an example of hit ratios for the 4 distinct parameter combo case (4 distinct parameter combo exist in a cell's historical data) according to embodiments of the present disclosure.

FIG. 24 illustrates an example of hit ratios for the 4 distinct parameter combo case (4 distinct parameter combo exist in a cell's historical data) 2400 according to embodiments of the present disclosure. An embodiment of the hit ratios for the 4 distinct parameter combo case (4 distinct parameter combo exist in a cell's historical data) 2400 shown in FIG. 24 is for illustration only.

In one embodiment, both the number of diagonal terms and the number of cross terms grows quadratically with L. FIG. 24 shows the hit ratio for the 4 distinct parameter comb case, where four parameter combos exist in the cell-level historical data. In particular, hit ratio is defined as:

$$\text{Hit Ratio} = \frac{\text{Number of hits}}{\text{Total number of cells}}$$

where hit ratio refers to the case where the recommended Total number of cells 1 parameter combo matches with the ground-truth parameter combo for a cell. As depicted in FIG. 24, the method outperforms by roughly 3% in terms of hit ratios and both methods outperform the conventional method significantly (>9%).

In case of CM diagnostics functions, analyzing the root cause of a network fault or performance loss and determining the erroneous parameters are highly useful for cellular operators. Furthermore, although there may not be any faults caused by parameter misconfiguration, the provided system can recommend a new parameter configuration for performance optimization such as adjusting the antenna electronic tilt to optimize coverage or adjusting handover parameters for mobility robustness optimization (MRO).

Figure 25:
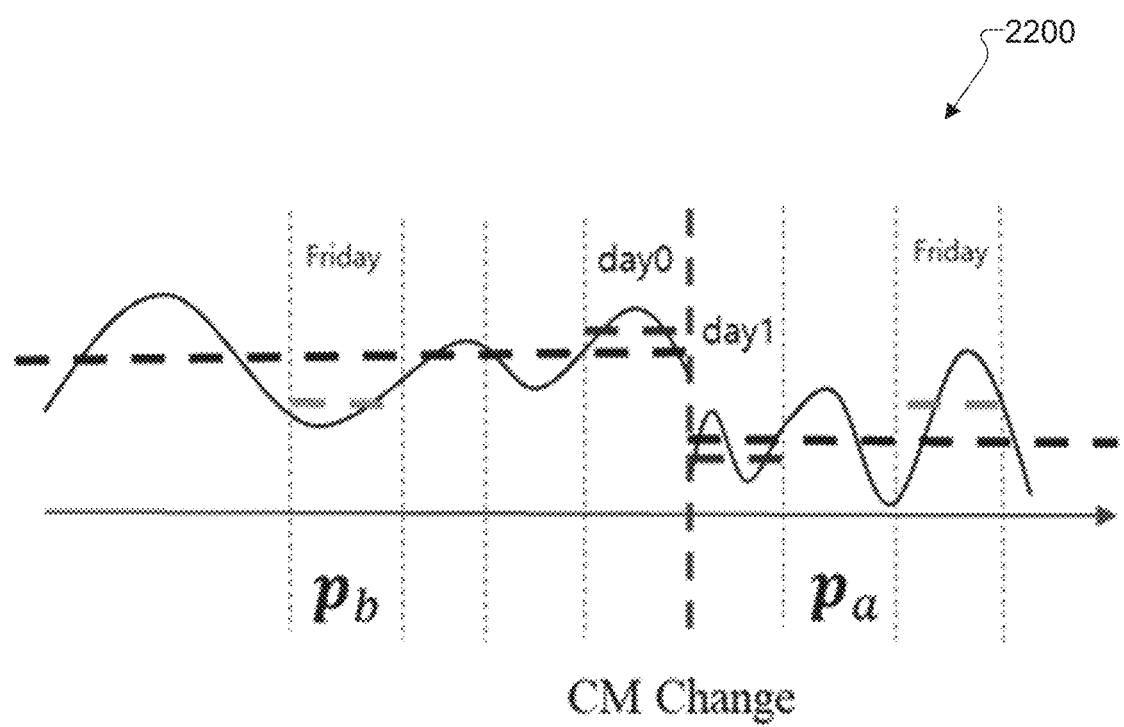
FIG. 25 illustrates an example of continuous improvement trial according to embodiments of the present disclosure.

FIG. 25 illustrates an example of continuous improvement trial 2500 according to embodiments of the present disclosure. An embodiment of the continuous improvement trial 2500 shown in FIG. 25 is for illustration only.

The provided advanced parameter recommendation techniques can be used in the continuous improvement trials. Conventionally, engineers manually adjust parameter values in field and need to timely compare pre- and post-change performance (e.g., they typically have only a few days to collect post-change data samples). In this case, the number of samples from the pre-change period (default parameter setting) is usually much larger than the number of samples from the post-change period (new parameter trial). Conventional ways to make such comparison in field are based on the average values of target KPI/KQI during different periods of time (see FIG. 25). Compared to the conventional solutions, the provided solutions can better capture the parameter impacts by filtering out the impact of other factors via a regression model and moreover, better handle the small-size samples via learning more sample-efficiently and having a more advanced decision process.

Figure 26:
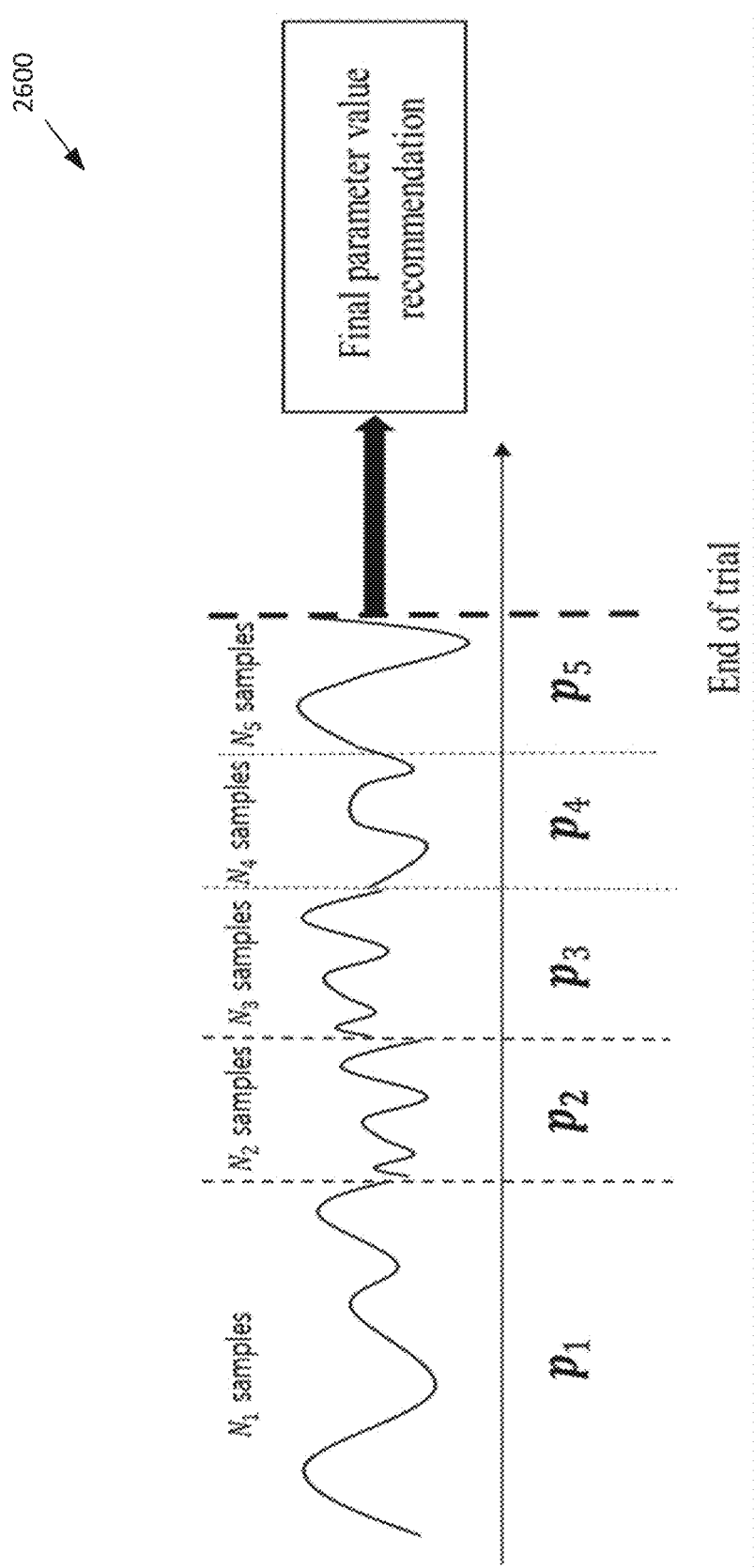
FIG. 26 illustrates an example of closed-loop parameter optimization according to embodiments of the present disclosure.

FIG. 26 illustrates an example of the closed-loop parameter optimization 2600 according to embodiments of the present disclosure. An embodiment of the closed-loop parameter optimization 2600 shown in FIG. 26 is for illustration only.

The provided parameter recommendation solutions can also be used in the closed-loop parameter optimization. In a closed-loop trial, parameters are usually tuned daily in field. For each online tuning parameter setting, the number of samples is small compared to the default parameter setting. At the end of a field trial, the final parameter values may be recommended (see FIG. 25).

Finally, in the cellular networks, based on domain knowledge, engineers can identify a set of candidate tuning parameters. If the number of candidate tuning parameters is greater than the target number (usually small) required for the closed-loop optimization, then the parameter sensitivity analysis can be useful to further reduce the number of tuning parameters and to choose the best possible tuning parameters.

Figure 31:
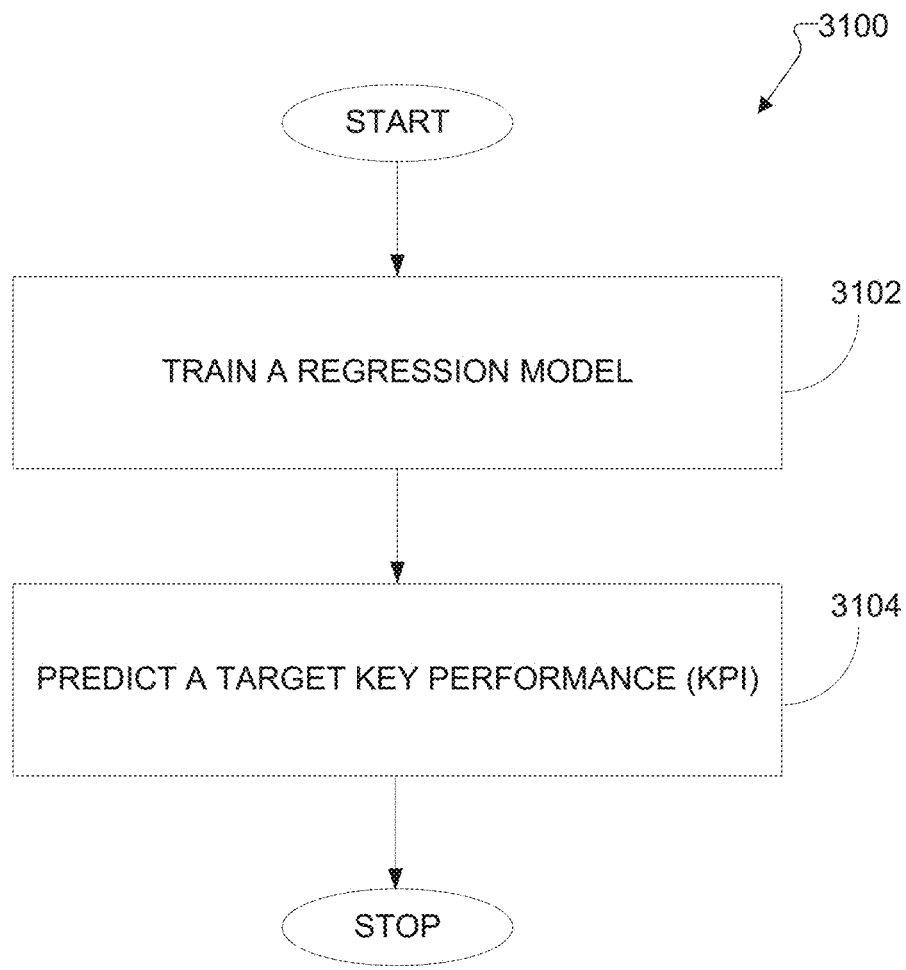
FIG. 31 illustrates an example of method for automating configuration management in a wireless communication network according to embodiments of the present disclosure.

FIG. 31 illustrates an example of method 3100 for automatic configuration management in a wireless communication network according to embodiments of the present disclosure. The method 3100 as may be performed by a network entity (e.g., network 102, 104, 116, 118, and 200 as illustrated in FIG. 2) and/or a client device (e.g., 106-114 as illustrated in FIG. 1). An embodiment of the method 2700 shown in FIG. 31 is for illustration only. One or more of the components illustrated in FIG. 31 can be implemented in specialized circuitry configured to perform the noted functions or one or more of the components can be implemented by one or more processors executing instructions to perform the noted functions.

As illustrated in FIG. 31, a method 3100 begins at step 3102. In step 3102, a network entity trains, based on historical samples, a regression model y using samples obtained from a set of parameters, wherein the regression model y comprises a function of a first term X and a second term h.

In such embodiment, the first term X corresponds to regressors that are selected factors from PM counters and the second term h corresponds to proxy variables, the first term X being non-tunable variables.

Subsequently, the network entity in step 3104 predicts, based on the regression model y, a target KPI to capture parameter impacts corresponding to the second term h.

In one embodiment, the network entity determines whether each of samples is balanced among the set of parameters and performs an oversampling operation based on a determination that each of samples is imbalanced.

In one embodiment, the network entity predicts an output of the regression model y based on a long-term cell operation.

In one embodiment, the network entity identifies a set of distinct parameters Pi each of which corresponding to the second term h; identifies a set of regression models yij corresponding to each of the set of distinct parameters Pi; and computes a median based on the set of regression models yij.

In one embodiment, the network entity selects, based on a ML operation, a set of KPIs from data of PM; and removes, from the set of KPIs, a KPI including causality with a CM setting for training the regression model y.

In one embodiment, the network entity computes a Pearson correlation coefficient for the target KPI and generates, based on the Pearson correlation coefficient, a ranking list including factors that are related to the target KPI.

In one embodiment, the network entity constructs a classification model using a ML algorithm; determines whether CM is changed; determines whether a KPI is degraded based on a determination that the CM is changed; and performs, based on the classification model, a diagnosis to determine whether a parameter misconfiguration causes a degradation of the KPI.

In one embodiment, the network entity computes first anomaly samples after changing of the CM and second anomaly samples before changing of the CM and generates, based on the first anomaly samples and the second anomaly samples, a relative metric and an absolute metric.

In one embodiment, the network entity computes, based on the relative metric and the absolute metric, average metrics; generates, based on the average metrics, a mapping function; and generates, based on the mapping function, output labels using a threshold, the output labels comprising an unlikely, an undecided, or a likely.

The above flowcharts illustrate example methods that can be implemented in accordance with the principles; of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A network entity in a communication system, the network entity comprising:
   memory; and
   a processor operably connected to the memory, the processor configured to:
   train, based on historical samples, a regression model y using samples obtained from a set of parameters, wherein the regression model y comprises a function of a first term X and a second term h, and
   predict, based on the regression model y, a target key performance index (KPI) to capture parameter impacts corresponding to the second term h.

2. The network entity of claim 1, wherein the processor is further configured to:
   determine whether each of samples is balanced among the set of parameters; and
   perform an oversampling operation based on a determination that each of samples is imbalanced.

3. The network entity of claim 1, wherein the first term X is a regressor that is a selected factor from a performance management (PM) counter and the second term h is a proxy variable, the first term X being a non-tunable variable.

4. The network entity of claim 1, wherein the processor is further configured to predict an output of the regression model y based on a long-term cell operation.

5. The network entity of claim 1, wherein the processor is further configured to:
   identify a set of distinct parameters $P_i$ each of which corresponding to the second term h;
   identify a set of regression models $y_{ij}$ corresponding to each of the set of distinct parameters $P_i$; and
   compute a median based on the set of regression models $y_{ij}$.

6. The network entity of claim 1, wherein the processor is further configured to:
   select, based on a machine learning (ML) operation, a set of KPIs from data of performance management (PM); and
   remove, from the set of KPIs, a KPI including causality with a configuration management (CM) setting for training the regression model y.

7. The network entity of claim 6, wherein the processor is further configured to:
   compute a Pearson correlation coefficient for the target KPI; and
   generate, based on the Pearson correlation coefficient, a ranking list including factors that are related to the target KPI.

8. The network entity of claim 1, wherein the processor is further configured to:
   construct a classification model using a machine learning (ML) algorithm;
   determine whether configuration management (CM) is changed;
   determine whether a KPI is degraded based on a determination that the CM is changed; and
   perform, based on the classification model, a diagnosis to determine whether a parameter misconfiguration causes a degradation of the KPI.

9. The network entity of claim 8, wherein the processor is further configured to:
   compute first anomaly samples after changing of the CM and second anomaly samples before changing of the CM; and
   generate, based on the first anomaly samples and the second anomaly samples, a relative metrics and absolute metrics.

10. The network entity of claim 9, wherein the processor is further configured to:
    compute, based on the relative metrics and the absolute metrics, average metrics;
    generate, based on the average metrics, a mapping function; and
    generate, based on the mapping function, output labels using a threshold, the output labels comprising an unlikely, an undecided, or a likely.

11. A method of a network entity in a communication system, the method comprising:
    training, based on historical samples, a regression model y using samples obtained from a set of parameters, wherein the regression model y comprises a function of a first term X and a second term h; and
    predicting, based on the regression model y, a target key performance index (KPI) to capture parameter impacts corresponding to the second term h.

12. The method of claim 11, further comprising:
    determining whether each of samples is balanced among the set of parameters; and
    performing an oversampling operation based on a determination that each of samples is imbalanced.

13. The method of claim 11, further comprising predicting an output of the regression model y based on a long-term cell operation, wherein the first term X is a regressor that is a selected factor from a performance management (PM) counter and the second term h is a proxy variable, the first term X being a non-tunable variable.

14. The method of claim 11, further comprising:
    identifying a set of distinct parameters $P_i$ each of which corresponding to the second term h;
    identifying a set of regression models $y_{ij}$ corresponding to each of the set of distinct parameters $P_i$; and
    computing a median based on the set of regression models $y_{ij}$.

15. The method of claim 11, further comprising:
    selecting, based on a machine learning (ML) operation, a set of KPIs from data of performance management (PM); and
    removing, from the set of KPIs, a KPI including causality with a configuration management (CM) setting for training the regression model y.

16. The method of claim 15, further comprising:
    computing a Pearson correlation coefficient for the target KPI; and
    generating, based on the Pearson correlation coefficient, a ranking list including factors that are related to the target KPI.

17. The method of claim 11, further comprising:
    constructing a classification model using a machine learning (ML) algorithm;
    determining whether configuration management (CM) is changed;
    determining whether a KPI is degraded based on a determination that the CM is changed; and
    performing, based on the classification model, a diagnosis to determine whether a parameter misconfiguration causes a degradation of the KPI.

18. The method of claim 17, further comprising:
    computing first anomaly samples after changing of the CM and second anomaly samples before changing of the CM; and generating, based on the first anomaly samples and the second anomaly samples, a relative metrics and absolute metrics.

19. The method of claim 18, further comprising:

computing, based on the relative metrics and the absolute metrics, average metrics;

generating, based on the average metrics, a mapping function; and generating, based on the mapping function, output labels using a threshold, the output labels comprising an unlikely, an undecided, or a likely.

20. A non-transitory computer-readable medium comprising program code, that when executed by at least one processor, causes a network entity to:

train, based on historical samples, a regression model y using samples obtained from a set of parameters, wherein the regression model y comprises a function of a first term X and a second term h, and predict, based on the regression model y, a target key performance index (KPI) to capture parameter impacts corresponding to the second term h.

* * * * *